United States Patent
Inaoka et al.

(10) Patent No.: US 7,402,644 B2
(45) Date of Patent: Jul. 22, 2008

(54) PRODUCTION PROCESSES FOR ALKYLENE OXIDE ADDITION PRODUCT AND ITS DERIVATIVES

(75) Inventors: Toru Inaoka, Yokohama (JP); Yoshiyuki Onda, Tokyo (JP); Hiromichi Tanaka, Yokohama (JP); Tsuyoshi Hirata, Kobe (JP)

(73) Assignee: Nippon Shikubai Co., Ltd., Osaka (JP)

( * ) Notice: Subject to any disclaimer, the term of this patent is extended or adjusted under 35 U.S.C. 154(b) by 553 days.

(21) Appl. No.: 10/500,554

(22) PCT Filed: May 2, 2003

(86) PCT No.: PCT/JP03/05602

§ 371 (c)(1),
(2), (4) Date: Jun. 30, 2004

(87) PCT Pub. No.: WO03/097716

PCT Pub. Date: Nov. 27, 2003

(65) Prior Publication Data

US 2005/0080298 A1    Apr. 14, 2005

(30) Foreign Application Priority Data

May 21, 2002    (JP)    ............... 2002-146663

(51) Int. Cl.
*C08F 20/26*    (2006.01)
*C07C 69/52*    (2006.01)
*C07C 43/00*    (2006.01)

(52) U.S. Cl. ............... 526/320; 560/224; 568/618

(58) Field of Classification Search ............... None
See application file for complete search history.

(56) References Cited

U.S. PATENT DOCUMENTS

| 6,048,916 | A | 4/2000 | Hirata et al. |
| 6,166,112 | A | 12/2000 | Hirata et al. |
| 6,174,980 | B1 | 1/2001 | Hirata et al. |
| 6,388,038 | B1 | 5/2002 | Hirata et al. |

FOREIGN PATENT DOCUMENTS

| EP | 0 799 807 A2 | 10/1997 |
| EP | 0 850 895 | 7/1998 |
| EP | 0 884 290 A2 | 12/1998 |
| EP | 0 965 605 A2 | 12/1999 |
| JP | 54-10399 | 1/1979 |
| JP | 60-199031 | 10/1985 |
| JP | 1-301713 | 12/1989 |
| JP | 9-328346 | 12/1997 |
| JP | 10-236859 | 9/1998 |
| JP | 11-60302 | 3/1999 |
| JP | 2000-344883 | 12/2000 |
| JP | 2001-220440 | 8/2001 |
| WO | WO 92/00365 | 1/1992 |
| WO | WO 03/027054 | 4/2003 |

*Primary Examiner*—Paul A Zucker
(74) *Attorney, Agent, or Firm*—Roylance, Abrams, Berdo & Goodman, L.L.P.

(57) ABSTRACT

The present invention provides: a production process for an alkylene oxide addition product, by which a high-molecular alkylene oxide addition product can be obtained with ordinary production facilities while the formation of by-products is suppressed; and production processes for derivatives from the alkylene oxide addition product. The present invention production process for an alkylene oxide addition product comprises the step of carrying out an addition reaction of an alkylene oxide to a hydroxyl-group-containing saturated compound in order to obtain the alkylene oxide addition product; with the production process being characterized by further comprising: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

13 Claims, No Drawings

PRODUCTION PROCESSES FOR ALKYLENE OXIDE ADDITION PRODUCT AND ITS DERIVATIVES

TECHNICAL FIELD

The present invention relates to production processes for an alkylene oxide addition product, a (meth)acrylate ester, and a (meth)acrylic copolymer. More particularly, the present invention relates to: a production process for a high-molecular alkylene oxide addition product by carrying out a specific addition reaction method; and relevant excellent production processes for a (meth)acrylate ester and a (meth)acrylic copolymer.

BACKGROUND ART

An alkylene oxide addition product as obtained by causing an alkylene oxide to add to a hydroxyl-group-containing compound (e.g. alcohols) is, for example, useful for obtaining a polycarboxylic acid which is suitable for a high-performance AE water-reducing agent, wherein the polycarboxylic acid is obtained by carrying out an esterification reaction between the alkylene oxide addition product and an unsaturated carboxylic acid (e.g. (meth)acrylic acid) or a transesterification reaction between the alkylene oxide addition product and an alkyl ester of (meth)acrylic acid, thereby introducing an unsaturated group into the alkylene oxide addition product, and thereafter carrying out copolymerization of the resultant product with an unsaturated carboxylic acid. The alkylene oxide addition product has hitherto been widely used as a raw material for polymers that are used for uses such as cement additives. In such a case, it is well known to be preferable for further enhancing the performances such as dispersibility that the alkylene oxide addition product has a large molecular weight.

A favorable method for producing the alkylene oxide addition product having a large molecular weight is to cause a larger amount of alkylene oxide to add to the hydroxyl-group-containing compound. However, in this case, the volume of the resultant product is very much larger than the volume of the raw materials as charged. Therefore, it has been usually necessary to use a reactor having a special shape or to use a special stirring apparatus, so there have been various limitations on usable production facilities.

In addition, as another problem occurring when the alkylene oxide addition product is produced by causing the alkylene oxide to add to the hydroxyl-group-containing compound, there has been also a problem such that: when the amount of water existing in the system is large in this addition reaction, by-products (e.g. poly(alkylene oxide)) increases. That is to say, it can also be conceived to use ordinary facilities with the volume of the raw materials as charged being decreased in consideration of the volume of the product. However, when the volume of the raw materials as charged is small, the amount of water mingling from an apparatus is so large relative to the amount of the raw materials as to bring about an increase of the by-products.

Furthermore, if the by-products (e.g. poly(alkylene oxide)) increases as mentioned above, there has been a problem of having an bad influence such that the reaction yield and the reaction selectivity decreases when various reactions are carried out by using the alkylene oxide addition product, particularly, when a (meth)acrylate ester is produced by carrying out an esterification reaction between the alkylene oxide addition product and (meth)acrylic acid or a transesterification reaction between the alkylene oxide addition product and an alkyl ester of (meth)acrylic acid, or when a (meth)acrylic copolymer is produced by carrying out a polymerization reaction of a monomer component including a (meth)acrylate ester as obtained by carrying out an esterification reaction between the alkylene oxide addition product and (meth)acrylic acid or a transesterification reaction between the alkylene oxide addition product and an alkyl ester of (meth)acrylic acid. In a specific explanation for the problem, a (meth)acrylate diester is by-produced when the esterification reaction or the transesterification reaction is carried out, and this (meth)acrylate diester acts as a crosslinking agent when the polymerization reaction is carried out, so that a high-molecular crosslinked polymer is by-produced.

As a production process for the alkylene oxide addition product used as a raw material for polymers that are used for uses such as cement additives, for example, JP-A-220440/2001 discloses a production process in which the water content of a liquid containing a catalyst and an alcohol is suppressed to not higher than a specific value, and JP-A-344883/2000 discloses a production process in which the water content of a reaction vessel is suppressed to not higher than a specific value by drying the reaction vessel after washing it with a solvent, and JP-A-236859/1998 discloses a production process in which an alkylene oxide addition reaction is carried out under specific temperature conditions. However, it is the present state of affairs that there has not yet been solved the problem such that: in the case where the alkylene oxide addition product having a high molecular weight is produced, the volume of the resultant product is very much larger than the volume of the raw materials as charged, therefore it is necessary to use a reactor having a special shape or to use a special stirring apparatus.

DISCLOSURE OF THE INVENTION

Object of the Invention

An object of the present invention is to provide: an excellent production process for an alkylene oxide addition product, by which a high-molecular alkylene oxide addition product can be obtained with ordinary production facilities while the formation of the by-products (e.g. poly(alkylene oxide)) is suppressed; and an excellent production process for a (meth)acrylate ester and an excellent production process for a (meth)acrylic copolymer, which production processes are relevant to the above production process for the alkylene oxide addition product.

SUMMARY OF THE INVENTION

The present inventors diligently studied in order to solve the above-mentioned problems. As a result, they have found out that: if there is carried out a process comprising the steps of first causing low mols of the alkylene oxide to add to a hydroxyl-group-containing saturated compound and subsequently causing the alkylene oxide to further add not to the entirety of the resultant alkylene oxide low-mol-addition product but to a portion thereof, then an alkylene oxide addition product having a high molar degree of polyaddition of the alkylene oxide can be produced by use of ordinary facilities without considering the increase of the volume of the product relative to the volume as charged. Furthermore, the present inventors have found out also that: in this process, it is not necessary to reduce the amount of the raw materials as charged in consideration of the volume of the product, therefore the increase of the amount of water, mingling from an apparatus, relative to such an amount of the raw materials as charged can be prevented, and the increase of the by-products (e.g. poly(alkylene oxide)) can be suppressed; and accordingly, various reactions can favorably be carried out by using the alkylene oxide addition product and, particularly, when a (meth)acrylate ester is produced by carrying out an esterification reaction between the alkylene oxide addition product and (meth)acrylic acid or a transesterification reaction between the alkylene oxide addition product and an alkyl ester of (meth)acrylic acid, or when a (meth)acrylic copolymer is produced by carrying out a polymerization reaction of a monomer component including a (meth)acrylate ester as obtained by carrying out an esterification reaction between the alkylene oxide addition product and (meth)acrylic acid or a transesterification reaction between the alkylene oxide addition product and an alkyl ester of (meth)acrylic acid, the formation of such as by-products can be suppressed, therefore excellent production processes for the above objective products can be provided.

That is to say, a production process for an alkylene oxide addition product, according to the present invention, comprises the step of carrying out an addition reaction of an alkylene oxide to a hydroxyl-group-containing saturated compound in order to obtain the alkylene oxide addition product;

with the production process being characterized by further comprising: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

In addition, a production process for a (meth)acrylate ester, according to the present invention, comprises the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid, thereby obtaining the (meth)acrylate ester;

with the production process being characterized in that the alkylene oxide addition product from the hydroxyl-group-containing saturated compound is a product obtained by a process including: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

Furthermore, a production process for a (meth)acrylic copolymer, according to the present invention, comprises the step of carrying out a polymerization reaction of a monomer component including a (meth)acrylate ester to thereby obtain the (meth)acrylic copolymer;

with the production process being characterized in that: the (meth)acrylate ester is a product obtained by a process including the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid;

wherein the alkylene oxide addition product from the hydroxyl-group-containing saturated compound is a product obtained by a process including: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

DETAILED DESCRIPTION OF THE INVENTION

Production Process for Alkylene Oxide Addition Product

The present invention production process for an alkylene oxide addition product is a process comprising the step of carrying out an addition reaction of an alkylene oxide to a hydroxyl-group-containing saturated compound in order to obtain the alkylene oxide addition product, and further comprises: the initial step of causing the alkylene oxide to add to the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step.

Incidentally, in the present invention, the molar degree of polyaddition means a molar-number-average degree of polyaddition, and denotes a molar-number-average degree of polyaddition per 1 mol of the hydroxyl group.

In the aforementioned initial step, it is important that the amount of the alkylene oxide as used is adjusted to not larger than 20 mols on average per 1 mol of the hydroxyl-group-containing saturated compound. This amount of the alkylene oxide as used is favorably not larger than 18 mols on average, more favorably not larger than 15 mols on average, still more favorably not larger than 12 mols on average.

Thereby, the change in volume between before and after the reaction in the initial step can be suppressed into such a range that the ordinary facilities can cope with this change of the volume (e.g. favorably to not more than 28 times, more favorably to not more than 22 times, still more favorably to not more than 16 times, yet still more favorably to not more than 10 times).

In the case where the amount of the alkylene oxide as used in the initial step is larger than 20 mols on average per 1 mol of the hydroxyl-group-containing saturated compound, the change in volume between before and after the reaction increases so much that special reactor shapes or special stirring apparatuses must be used. In addition, it can also be conceived to use ordinary facilities with the amount of the hydroxyl-group-containing saturated compound as charged being decreased. However, in this case, there are disadvantages in that: the amount of water mingling from an apparatus is so large as to bring about an increase of the by-products (e.g. poly(alkylene oxide)).

There is no especial limitation on the lower limit value of the amount of the alkylene oxide as used in the aforementioned initial step if it is in such a range as does not damage the effects of the present invention. However, it is favorably not smaller than 1 mol on average, more favorably not smaller than 2 mols on average, still more favorably not smaller than 3 mols on average, yet still more favorably not smaller than 5 mols on average, per 1 mol of the hydroxyl-group-containing saturated compound.

There is no especial limitation on the hydroxyl-group-containing saturated compound as used in the aforementioned initial step if it is a saturated compound having one hydroxyl group per molecule. However, it is favorably a hydroxyl-group-containing saturated compound which is a hydrocarbon family member in view of sufficiently displaying the effects of the present invention. The hydrocarbon family member in this case means a compound comprising three atoms of carbon, hydrogen, and oxygen in an amount of not smaller than 70 weight %, favorably not smaller than 80 weight %, more favorably not smaller than 90 weight %, of the weight of this compound. Furthermore, a favorable one for more sufficiently displaying the effects of the present invention is a saturated monohydric alcohol or monohydric phenol having 1 to 30 carbon atoms. This saturated monohydric alcohol or monohydric phenol favorably has 1 to 20 carbon atoms, more favorably 1 to 15 carbon atoms, still more favorably 1 to 9 carbon atoms, yet still more favorably 1 to 6 carbon atoms. In the case where the saturated monohydric alcohol or monohydric phenol has more than 30 carbon atoms, there are disadvantages in that: for example, in the case where a copolymer is produced through such as the addition reaction of the alkylene oxide, the esterification reaction or transesterification reaction, and the polymerization reaction, the water-solubility of this copolymer is so low that the performances for uses, such as cement dispersibility, may be deteriorated.

In the case of using the saturated monohydric alcohol or monohydric phenol having 1 to 30 carbon atoms as the hydroxyl-group-containing saturated compound as used in the aforementioned initial step, specific examples thereof include saturated monohydric alcohols or monohydric phenols having 1 to 30 carbon atoms and containing such as alkyl groups (e.g. a methyl group, an ethyl group, a n-propyl group, an isopropyl group, a n-butyl group, an octyl group, a 2-ethylhexyl group, a dodecyl group, a hexadecyl group, and an octadecyl group), aryl groups (e.g. a phenyl group); phenylalkyl groups (e.g. a benzyl group); alkylphenyl groups (e.g. a nonylphenyl group); and cycloalkyl groups (e.g. a cyclohexyl group). Of these, saturated aliphatic monohydric alcohols having 1 to 30 carbon atoms or phenol is favorable, and saturated aliphatic monohydric alcohols having 1 to 6 carbon atoms, such as methanol, ethanol, propanol, and butanol, are more favorable, and the methanol is particularly favorable, for sufficiently displaying the effects of the present invention.

In the aforementioned initial step, there is favorably used such a hydroxyl-group-containing saturated compound as has a water content of not more than 6,000 ppm, more favorably not more than 4,000 ppm, still more favorably not more than 2,000 ppm, yet still more favorably not more than 1,000 ppm, particularly favorably not more than 500 ppm. Such adjustment of the water content to not more than 6,000 ppm can more suppress the formation of the by-products (e.g. poly(alkylene oxide)) in the initial step, and at the same time can more suppress the formation of the by-products (e.g. poly(alkylene oxide)) also in the subsequent molar-degree-of-polyaddition-adjusting step. Particularly, when the saturated aliphatic monohydric alcohol having 1 to 6 carbon atoms such as methanol, ethanol, propanol, or butanol is used as the hydroxyl-group-containing saturated compound, such a hydroxyl-group-containing saturated compound has a low boiling point and it is therefore difficult to remove water by a dehydration process under heating and under reduced pressure, so there is favorably used such as has a low water content. In the case where the water content is more than 6,000 ppm, the by-products (e.g. poly(alkylene oxide)) increase in the initial step, so that the resultant alkylene oxide low-mol-addition product contains the poly(alkylene oxide) in a large amount. Then, in the subsequent molar-degree-of-polyaddition-adjusting step, the poly(alkylene oxide), contained as an impurity, further adds to the alkylene oxide to thereby by-produce a poly(alkylene oxide) having a large molecular weight. Therefore, for example, in the case where the resultant alkylene oxide addition product is used as a raw material for cement additive polymers, there are disadvantages in that the performance as a cement dispersant is deteriorated.

There is no especial limitation on the aforementioned alkylene oxide usable in the present invention. However, alkylene oxides having 2 to 4 carbon atoms are favorable. Specific examples thereof include ethylene oxide, propylene oxide, and butylene oxide. These can be used either alone respectively or in combinations with each other.

In the aforementioned molar-degree-of-polyaddition-adjusting step, the alkylene oxide is caused to further add to the alkylene oxide low-mol-addition product as obtained in the aforementioned initial step. Therefore, when compared with the case of carrying out a direct addition reaction of the same mols of the alkylene oxide to the hydroxyl-group-containing saturated compound, the change in volume between before and after the reaction is so small that the alkylene oxide can be caused to add to a desired molar degree of polyaddition with ordinary facilities having neither special reactor shapes nor special stirring apparatuses.

The present invention is characterized in that a portion of the entirety of the alkylene oxide low-mol-addition product as obtained in the aforementioned initial step is used in the aforementioned molar-degree-of-polyaddition-adjusting step. Because, in this way, not the entirety but a portion of the alkylene oxide low-mol-addition product as obtained in the initial step is used in the molar-degree-of-polyaddition-adjusting step, an alkylene oxide addition product having a high molar degree of polyaddition of the alkylene oxide can be produced by use of ordinary facilities without considering the increase of the volume of the product relative to the volume as charged. Furthermore, in this process, it is not necessary to reduce the amount of the raw materials as charged in consideration of the volume of the product, therefore the increase of the amount of water, mingling from an apparatus, relative to such an amount of the raw materials as charged can be prevented, and the increase of the by-products (e.g. poly(alkylene oxide)) can be suppressed.

As is mentioned above, the present invention is characterized in that a portion of the entirety of the alkylene oxide low-mol-addition product as obtained in the aforementioned initial step is used in the aforementioned molar-degree-of-polyaddition-adjusting step. However, in this case, the residual portion that has not been used may be used in a further molar-degree-of-polyaddition-adjusting step. In this case, it is not necessary to use the entirety of the residual portion.

In the present invention, it is favorable for sufficiently displaying the effects of the present invention that: a portion of the entirety of the alkylene oxide low-mol-addition product as obtained in the aforementioned initial step is used to carry out the aforementioned molar-degree-of-polyaddition-adjusting step, and then at least a portion of the rest is used to carry out the molar-degree-of-polyaddition-adjusting step one time or at least two divided times. More favorably, the number of times of the aforementioned molar-degree-of-polyaddition-adjusting step carried out with at least a portion of the rest is one time or two times, particularly favorably one time.

In the present invention, the amount of the alkylene oxide low-mol-addition product as used in the molar-degree-of-polyaddition-adjusting step is favorably adjusted to not larger than 60%, more favorably not larger than 55%, still more favorably not larger than 50%, yet still more favorably not larger than 45%, particularly favorably not larger than 40%, of the entire volume of the reactor as used in this step. In the molar-degree-of-polyaddition-adjusting step of the present invention, the change in volume between before and after the reaction is so small that the molar degree of polyaddition of the alkylene oxide can be enhanced with ordinary facilities. However, in the case where the amount of the alkylene oxide low-mol-addition product as used is larger than 60% of the entire volume of the reactor, the use of ordinary facilities has a possibility that: the amount of the alkylene oxide as used is limited, and the alkylene oxide is difficult to cause to add to a desired molar degree of polyaddition.

In the case of intending to obtain the alkylene oxide addition product having a very high molar degree of polyaddition, the aforementioned molar-degree-of-polyaddition-adjusting step is favorably carried out at least two divided times. For specific example, in the case where such as an alkylene oxide addition product having a molar degree of polyaddition of not less than 50 is desired, there can be one example in which: an alkylene oxide 20-mol-addition product is produced in a first-time molar-degree-of-polyaddition-adjusting step, and subsequently 30 mols of the alkylene oxide is caused to further add to the above alkylene oxide 20-mol-addition product.

In the present invention, as to the aforementioned molar-degree-of-polyaddition-adjusting step, it is permitted that: a portion of the alkylene oxide low-mol-addition product as obtained is extracted and transferred to such as a storage tank after the aforementioned initial step, and then the aforementioned molar-degree-of-polyaddition-adjusting step is carried out with the same reactor as of the aforementioned initial step; or a portion of the alkylene oxide low-mol-addition product as obtained in the aforementioned initial step is transferred to a different reactor, and then the aforementioned molar-degree-of-polyaddition-adjusting step is carried out with a reactor different from that as used in the aforementioned initial step.

In the aforementioned molar-degree-of-polyaddition-adjusting step, it is favorable that the amount of the alkylene oxide as used is adjusted to not larger than 20 mols on average per 1 mol of the alkylene oxide low-mol-addition product. This amount of the alkylene oxide as used is more favorably not larger than 18 mols on average, still more favorably not larger than 15 mols on average, yet still more favorably not larger than 12 mols on average.

Thereby, the change in volume between before and after the reaction in the molar-degree-of-polyaddition-adjusting step can be suppressed into such a range that the ordinary facilities can cope with this change of the volume (e.g. favorably to not more than 28 times, more favorably to not more than 22 times, still more favorably to not more than 16 times, yet still more favorably to not more than 10 times).

In the case where the amount of the alkylene oxide as used in the molar-degree-of-polyaddition-adjusting step is larger than 20 mols on average per 1 mol of the alkylene oxide low-mol-addition product, the change in volume between before and after the reaction increases so much that special reactor shapes or special stirring apparatuses must be used. In addition, it can also be conceived to use ordinary facilities with the amount of the alkylene oxide low-mol-addition product as charged being decreased. However, in this case, there are disadvantages in that: the amount of water mingling from an apparatus is so large as to bring about an increase of the by-products (e.g. poly(alkylene oxide)).

There is no especial limitation on the lower limit value of the amount of the alkylene oxide as used in the aforementioned molar-degree-of-polyaddition-adjusting step if it is in such a range as does not damage the effects of the present invention. However, it is favorably not smaller than 1 mol on average, more favorably not smaller than 2 mols on average, still more favorably not smaller than 3 mols on average, yet still more favorably not smaller than 5 mols on average, per 1 mol of the alkylene oxide low-mol-addition product.

When the alkylene oxide is caused to add in the present invention, favorably usable as catalysts are such as alkaline metals, alkaline earth metals, and their hydroxides, more favorably at least one of such as sodium, sodium amalgam, sodium halides, sodium hydroxide, potassium, potassium amalgam, potassium halides, and potassium hydroxide. As to these catalysts, those which remain in the product as obtained in the initial step act in the molar-degree-of-polyaddition-adjusting step, and therefore the catalysts may be added only in the initial step. However, the catalysts are favorably added in both the initial step and the molar-degree-of-polyaddition-adjusting step. Incidentally, there is no especial limitation on the amount of the catalysts as used. However, this amount is favorably adjusted into the range of 10 to 5,000 ppm relative to the alkylene oxide addition product.

There is no especial limitation on the reaction temperature in the aforementioned initial step. However, this reaction temperature is favorably adjusted into the range of 60 to 180° C., more favorably 60 to 160° C., still more favorably 70 to 150° C. In the case where the reaction temperature is higher than 180° C., the by-products (e.g. poly(alkylene oxide)) tend to increase and, for example, the performances such as water reducibility tend to be deteriorated in the case of using the resultant alkylene oxide addition product to obtain a polymer for cement dispersants. On the other hand, in the case where the reaction temperature is lower than 60° C., there are disadvantages in that the addition rate is so slow as to result in low productivity.

There is no especial limitation on the reaction temperature in the aforementioned molar-degree-of-polyaddition-adjusting step. However, this reaction temperature is favorably adjusted into the range of 80 to 180° C., more favorably 90 to 170° C., still more favorably 100 to 160° C. In the case where the reaction temperature is higher than 180° C., the by-products (e.g. poly(alkylene oxide)) tend to increase and, for example, the performances such as water reducibility tend to be deteriorated in the case of using the resultant alkylene oxide addition product to obtain a polymer for cement dispersants. On the other hand, in the case where the reaction temperature is lower than 80° C., there are disadvantages in that the addition rate is so slow as to result in low productivity.

The addition reaction in the aforementioned initial step and the aforementioned molar-degree-of-polyaddition-adjusting step may be carried out either in a batch manner or in a continuous manner, but is usually carried out by continuously introducing the alkylene oxide into the hydroxyl-group-containing saturated compound or the alkylene oxide low-mol-addition product (and the aforementioned catalyst when the occasion demands). In addition, the aforementioned addition reaction is favorably carried out under an atmosphere of inert gas such as nitrogen, argon, and helium, particularly favorably under an atmosphere of nitrogen. In addition, the aforementioned addition reaction is favorably carried out under pressure.

There is no especial limitation on the size of the reactor in the case of producing the alkylene oxide addition product by the present invention production process for the alkylene oxide addition product. However, as the volume of the reactor becomes larger, the effects of the present invention can be displayed more and more sufficiently. Therefore, effective is the production scale of favorably not smaller than 100 L, more favorably not smaller than 500 L, still more favorably not smaller than 1 $m^3$, yet still more favorably not smaller than 5 $m^3$.

Production Process for (Meth)Acrylate Ester

In the above-mentioned present invention production process for an alkylene oxide addition product, it is not necessary to reduce the amount of the raw materials as charged in consideration of the volume of the product, therefore the increase of the amount of water, mingling from an apparatus, relative to such an amount of the raw materials as charged can be prevented, and the increase of the by-products (e.g. poly (alkylene oxide)) can be suppressed. Accordingly, various reactions can favorably be carried out by using the alkylene oxide addition product. Particularly, when a (meth)acrylate ester is produced by carrying out an esterification reaction between the alkylene oxide addition product and (meth) acrylic acid or a transesterification reaction between the alkylene oxide addition product and an alkyl ester of (meth) acrylic acid, the use of the alkylene oxide addition product as obtained by the present invention production process for the alkylene oxide addition product can prevent the formation of further by-products (e.g. diesters) in the esterification reaction, wherein the further by-products (e.g. diesters) are derived from the aforementioned by-products (e.g. poly(alkylene oxide)). Then, the (meth)acrylate ester in which the content of the by-products (e.g. diesters) as impurities is suppressed to low is useful for various uses. For example, in the case where the (meth)acrylate ester is formed into the (meth)acrylic copolymer by the polymerization reaction as mentioned below, this copolymer can display the excellent performance as a cement admixture.

That is to say, the present invention production process for a (meth)acrylate ester comprises the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid, thereby obtaining the (meth)acrylate ester;

with the production process being characterized in that the alkylene oxide addition product from the hydroxyl-group-containing saturated compound is a product obtained by a process including: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

Favorable modes for carrying out the above esterification reaction are explained below.

In the first place, a reactor is charged with the alkylene oxide addition product as obtained by the present invention production process and the (meth)acrylic acid (favorably, further a dehydrating solvent, an acid catalyst, and a polymerization inhibitor), and the esterification reaction of their mixture is carried out at a predetermined temperature until its esterification ratio reaches a predetermined value.

As to the (meth)acrylic acid usable in the above esterification reaction, the acrylic acid and the methacrylic acid may be used either alone respectively or in combinations with each other. Also as to its mixing ratio, any range can be adopted.

The mixing ratio of the above raw alkylene oxide addition product and (meth)acrylic acid as used in the esterification reaction is stoichiometrically 1:1 (molar ratio), but in reality there is no especial limitation on this mixing ratio if it is in such a range that the esterification reaction between the alkylene oxide addition product and the (meth)acrylic acid proceeds efficiently. Usually, for example, the esterification reaction may be hastened by using either one of the raw materials in excess, or such a raw material as is easy to distill off and has a lower boiling point may be used in excess in view of the purification of the objective esterification product. In addition, in the present invention, when water as formed by the reaction is distilled off during the esterification reaction, a portion of the low-boiling-point (meth)acrylic acid is also distilled off and discharged outside the reactor. Therefore, the amount of the (meth)acrylic acid as used (amount as charged) relative to the amount of the alkylene oxide as used (amount as charged) is favorably added in excess of a stoichiometrically calculated one. Specifically, the amount of the (meth) acrylic acid as used is usually in the range of favorably 1.0 to 30 mols, more favorably 1.2 to 10 mols, per 1 mol of the alkylene oxide addition product. In the case where the amount of the (meth)acrylic acid as used is smaller than 1.0 mol per 1 mol of the alkylene oxide addition product, the esterification reaction does not proceed smoothly, and therefore the yield of the objective esterification product is insufficient. On the other hand, in the case where the amount of the (meth)acrylic acid as used is larger than 30 mols, there still are disadvantages in that: the enhancement of the yield reflecting the addition is not seen, so it is uneconomical.

In the esterification reaction of the present invention, it is desirable to carry out the esterification reaction in the presence of the acid catalyst. The reaction as carried out in the presence of the acid catalyst enables quick progress of the reaction. Examples of the acid catalyst usable in the esterification reaction of the present invention include sulfuric acid, methanesulfonic acid, and p-toluenesulfonic acid that are used in the form of hydrate and/or aqueous solution. These may be used either alone respectively or in combinations with each other. Furthermore, more desirable are acid catalysts which rarely cleave the raw alkylene oxide addition product. Specifically, the p-toluenesulfonic acid is used in the form of hydrate and/or aqueous solution.

There is no especial limitation on the amount of the above acid catalyst as used if it is in such a range that the desired catalysis can be displayed effectively. However, it is favorably not larger than 0.4 milliequivalent/g, more favorably in the range of 0.01 to 0.36 milliequivalent/g, particularly favorably 0.05 to 0.32 milliequivalent/g, relative to the total weight of the alkylene oxide addition product and the (meth)acrylic acid. In the case where the amount of the acid catalyst as used is larger than 0.4 milliequivalent/g, the amount of the diesters as formed in the reactor during the esterification reaction increases, so there are disadvantages in that: for example, in the case of synthesizing a cement dispersant by using the esterification product as obtained by the esterification reaction, its cement dispersibility is deteriorated.

The method for adding the above acid catalyst to the reactor may be carried out in a lump, continuously, or in order, but the acid catalyst is favorably charged into the reactor in a lump together with the raw materials in view of the workability.

In addition, the above esterification reaction is favorably carried out in the presence of the polymerization inhibitor. The use of the polymerization inhibitor can suppress the polymerization of the raw alkylene oxide addition product and (meth)acrylic acid, the esterification product as the product, or mixtures thereof. As to the polymerization inhibitor usable in the above esterification reaction, publicly known polymerization inhibitors are usable, and they are not especially limited. Examples thereof include phenothiazine, benzoquinone, hydroquinone, methoquinone, butylcatechol, picric acid, and copper (II) chloride. Of these polymerization inhibitors, the phenothiazine, the hydroquinone, and the methoquinone are favorably used because of the solubility in the water as formed by the reaction and further in the dehydrating solvents. These polymerization inhibitors may be used either alone respectively or in combinations with each other. Particularly, the phenothiazine, the methoquinone, and the hydroquinone are extremely useful because: they not only can effectively function upon gel-formable substances in an aqueous solution existing in the reactor in the case where the acid catalyst is used in the form of hydrate and/or aqueous solution as mentioned above, but also can display the polymerization inhibitability extremely effectively, even if a water-soluble polymerization inhibitor having a polymerization activity though it is weak is not used, also in the case where mentioned below, the dehydrating solvent is distilled off by azeotropic distillation with the water after the end of the esterification reaction, therefore they can effectively suppress the formation of high-molecular polymers.

The amount of the above polymerization inhibitor as used is favorably in the range of 0.001 to 1 weight %, more favorably 0.001 to 0.1 weight %, relative to the total amount of the raw alkylene oxide addition product and (meth)acrylic acid as charged. In the case where the amount of the polymerization inhibitor as used is smaller than 0.001 weight %, there are disadvantages in that: the polymerization inhibitability is not displayed sufficiently, therefore the polymerization of the raw alkylene oxide addition product and (meth)acrylic acid, the esterification product as the product, or mixtures thereof is difficult to effectively inhibit. In the case where the amount of the polymerization inhibitor as used is larger than 1 weight %, there are disadvantages in view of the quality and the performance because the amount of the polymerization inhibitor remaining in the esterification product as the product increases, and further there are disadvantages also in economical view because no further effects reflecting the excessive addition are obtained, either.

Furthermore, in the present invention, from such a viewpoint that it is favorable in view of the handling that the water as formed by the reaction can be distilled off from the reactor at a lower temperature, the esterification reaction is favorably carried out in the presence of the dehydrating solvent. In the present specification, the dehydrating solvent is defined as a solvent as azeotropically distilled with water. That is to say, the use of the dehydrating solvent enables efficient azeotropic distillation of the water as formed by the esterification reaction. Examples of the dehydrating solvent include benzene, toluene, xylene, cyclohexane, dioxane, pentane, hexane, heptane, chlorobenzene, and isopropyl ether. These can be used either alone respectively or in combinations with each other as a mixed solvent. Favorable of these are those of which the temperature of the azeotropic distillation with the water is favorably not higher than 200° C., more favorably in the range of 50 to 150° C., still more favorably 60 to 100° C. Specific examples thereof include the cyclohexane, the toluene, the dioxane, the benzene, the isopropyl ether, the hexane, and the heptane. In the case where the temperature of the azeotropic distillation with the water is higher than 200° C., there are disadvantages in view of the handling (for example, including the control of the temperature in the reactor during the reaction and the control of such as condensation liquefaction treatment of the azeotrope).

The above dehydrating solvent is desired to be refluxed while there are carried out operations of azeotropically distilling it off out of the reaction system together with water as a reaction product and then separating and thus removing the distilled-off water as a reaction product by its condensation liquefaction. Hereupon, the amount of the dehydrating solvent as used is in the range of 1 to 100 weight %, favorably 2 to 50 weight %, relative to the total amount of the raw alkylene oxide addition product and the raw (meth)acrylic acid as charged. In the case where the dehydrating solvent as used is smaller than 1 weight %, there are disadvantages in that: the water as a reaction product formed during the esterification reaction cannot sufficiently be removed out of the reaction system by azeotropic distillation, and it is therefore difficult for the equilibrium reaction of the esterification to proceed. In the case where the dehydrating solvent as used is larger than 100 weight %, there are disadvantages from the economical viewpoint in that there is not obtained any effect rewarding the excessive addition, and further in that a large quantity of heat is needed for keeping the reaction temperature constant.

When the dehydrating solvent is used in the above esterification reaction, it is desirable that the solvent-circulating rate during the esterification reaction is set favorably at not less than 0.5 cycle/hour, more favorably at not less than 1 to 100 cycles/hour. Thereby, it becomes unnecessary to carry out the reaction at a reaction temperature as raised to an impurities-forming temperature region (exceeding 130° C.), and it is therefore possible to prevent impurities from forming in the reaction tank. In addition, if the solvent-circulating rate is accelerated, then the water as a reaction product can efficiently be distillated from the reaction tank by the azeotropic distillation without allowing this water to reside in the reaction tank for a long period of time, so that the equilibrium reaction inclines toward the esterification, therefore the reaction time can be shortened, too.

Herein the "solvent-circulating rate during the esterification reaction" means what is defined as follows. That is to say, as to the entire quantity (volumetric quantity) of the dehydrating solvent as charged into the reaction tank, the one cycle is defined as a circulation of the quantity (volumetric quantity) corresponding to the entire quantity of the dehydrating solvent as charged into the reaction tank in circulating the dehydrating solvent (as contained in the reaction tank) during the esterification reaction in a manner such that the dehydrating solvent is discharged from the reaction tank and then passed through a circulation route and then returned to the reaction tank again. Then, the "solvent-circulating rate during the esterification reaction" is represented by such cycles per unit time (1 hour), so its unit is "cycles/hour". Accordingly, for example, as to the entire quantity of the dehydrating solvent as charged into the reaction tank, when 15 times the quantity corresponding to this entire quantity has been circulated in 5 hours, the solvent-circulating rate is 3 cycles/hour. Similarly, as to the entire quantity of the dehydrating solvent as charged into the reaction system, when half (0.5 times) the quantity corresponding to this entire quantity has been circulated in 2 hours, the solvent-circulating rate is 0.25 cycle/hour.

Incidentally, when the dehydrating solvent (as contained in the reaction system) is circulated in a manner such that the dehydrating solvent is distilled from the reaction system and then liquefied by condensation and then returned to the reaction system, there can be a case where what is circulated (an object being circulated) may contain, besides the dehydrating solvent, depending on modes for carrying out this circulation, low-boiling-point raw materials (being distillated: mainly, the raw (meth)acrylic acid) and various additives such as gelation inhibitors (e.g. polymerization inhibitors or solvents containing them) as added to inhibit these distillated raw materials from gelling to form harmful impurities, though the quantities of these other components are small. Therefore, in the case where the additives such as gelation inhibitors are used, it is desirable to fittingly adjust the set conditions in consideration that the variation of the solvent-circulating rate with the progress of the esterification reaction is caused by the use of the additives.

The above reaction temperature and the solvent-circulating rate can be adjusted into desired ranges by selecting such as: method (means) for heating the reaction tank; temperature (quantity of heat) as applied to the reaction tank with an apparatus as the above heating means; and amount of the dehydrating solvent as used relative to the raw materials as charged into the reaction tank. Incidentally, the reaction temperature is the maximum temperature in the reaction tank. That is to say, depending on modes of apparatuses as used as the heating means (e.g. external jackets, internal heaters), the temperature in the reaction tank (reaction temperature) differs according to positions therein, and also rises with the progress of the esterification reaction, and also varies with the passage of time. However, because the rise of the reaction temperature brings about formation of impurities, it is necessary for the reaction temperature not to exceed the above-defined upper limit temperature, regardless of conditions as to the position and time, wherever the position may be and whenever the time may be. Thus, herein the reaction temperature has bee decided to be defined as the maximum temperature.

In the present invention, the esterification reaction can be carried out either in a batch manner or in a continuous manner, but the esterification reaction is favorably carried out in the batch manner.

In addition, the reaction conditions in the esterification reaction may be conditions where the esterification reaction proceeds smoothly. The reaction temperature is favorably in the range of 30 to 140° C., more favorably 60 to 130° C., still more favorably 90 to 125° C., particularly favorably 100 to 120° C. In the case where the reaction temperature is lower than 30° C., there are disadvantages in that: the progress of the esterification reaction is difficult, and it also takes much time to dehydrate (distill off) the water as formed by the reaction, therefore the time as required for the esterification reaction is prolonged. On the other hand, in the case where the reaction temperature is higher than 140° C., an excessive amount of diesters are formed due to cleavage of the raw alkylene oxide addition product to deteriorate the dispersibility (e.g. cement dispersibility) and the thickening property in the case where the product is used for various uses, and further there still are disadvantages in such that: the polymerization of the raw materials occurs or the amount of the raw materials mingling into the distillate increases, therefore, for example, the deterioration of the performance and the quality of the esterification product as the product occurs. In addition, the reaction time is, as mentioned below, until the esterification ratio favorably reaches at least 70%, more favorably at least 80%, but the reaction time is usually in the range of favorably 1 to 50 hours, more favorably 3 to 40 hours. Furthermore, the esterification reaction in the present invention may be carried out either under normal pressure or under reduced pressure, but it is desirable to carry out the esterification reaction under normal pressure in view of facilities.

<Conditions for Measurement of Esterification Ratio>:

Analyzer: Millennium Chromatography Manager produced by Waters Co., Ltd.

Detector: 410 RI detector produced by Waters Co., Ltd.

Columns as used: three columns of Inertsil ODS-2 produced by GL Science.

Column temperature: 40° C.

Eluent: a solution as obtained by blending 8,946 g of water, 6,000 g of acetonitrile, and 54 g of acetic acid together and thereafter adjusting the pH to 4.0 with a 30% aqueous sodium hydroxide solution.

Flow rate: 0.6 ml/min

<Equation for Calculation of Esterification Ratio>:

Esterification ratio (%)=[{(measured area of alcohol as charged)−(measured area of alcohol at end of esterification)}/(measured area of alcohol as charged)]×100

Incidentally, because the esterification ratio is determined in accordance with the above equation, the esterification ratio does not exceed 100%. Accordingly, in the present invention, a point of time when the esterification ratio has reached not less than a prescribed value (100% at the maximum) is regarded as the end of the esterification reaction.

In the present invention, it is favorable that the aforementioned (meth)acrylate ester is subjected to the polymerization in the form of an esterification reaction product as obtained by a process including the step of carrying out an esterification reaction of "p" parts by weight of the aforementioned alkylene oxide addition product and "q" parts by weight of the (meth)acrylic acid under conditions satisfying a relationship of $[(p/n^{1/2})/q] \times 100 \leq 200$ (where n is a molar-number-average degree of polyaddition of the oxyalkylene group).

If the esterification reaction is carried out in the presence of the (meth)acrylic acid in excess of the alkylene oxide addition product in the above way, the resultant (meth)acrylate ester is present in the form of a mixture containing the (meth)acrylic acid, therefore there are advantages in that the (meth)acrylic copolymer can be produced by subjecting to the copolymerization reaction this mixture either as it is without isolating it, or after having, if necessary, further added thereto the (meth)acrylic acid and/or another monomer copolymerizable with these monomers, favorably the above mixture as it is without isolating it. That is to say, if the amounts of the alkylene oxide addition product and the (meth)acrylic acid as used are adjusted into the above ranges, there are industrial advantages in that the step of isolating the (meth)acrylate ester can be omitted appropriately for the mass production.

The value of the above expression $[(p/n^{1/2})/q] \times 100$ is referred to also as "K value", and this K value is an index of the average number of polyalkylene glycol chains per weight of the carboxylic acid. In the present invention, the K value is favorably in the range of 42 to 190 ($42 \leq$ K value $\leq 190$), more favorably 45 to 160 ($45 \leq$ K value $\leq 160$). Hereupon, in the case where the K value is smaller than 40, there are disadvantages in that the cement dispersibility of the resultant cement admixture is not sufficient. Or otherwise in the case where the K value is larger than 200, there are disadvantages in that: the cement dispersibility of the resultant cement admixture is still low, and further the esterification reaction time increases so much as to result in greatly low productivity.

In the above expression $[(p/n^{1/2})/q]\times100\leqq200$, n is a molar-number-average degree of polyaddition of the oxyalkylene group and is a number of 1 to 300, but is favorably a number of 2 to 300, more favorably a number of 2 to 200, still more favorably a number of 2 to 150, yet still more favorably a number of 2 to 110, yet still more favorably a number of 2 to 100, yet still more favorably a number of 2 to 50. In the case where n is larger than 300, there are disadvantages in that the polymerizability of the esterified product from the alkylene oxide addition product and the (meth)acrylic acid is low.

That is to say, in the present invention, it is favorable that the aforementioned (meth)acrylate ester is an esterification reaction product as obtained by a process including the step of carrying out an esterification reaction of "p" parts by weight of the aforementioned alkylene oxide addition product and "q" parts by weight of the (meth)acrylic acid in the presence of an acid catalyst under conditions satisfying such a relationship of $[(p/n^{1/2})/q]\times100\leqq200$ (where n is a molar-number-average degree of polyaddition of the oxyalkylene group and is a number of 1 to 300, more favorably a number of 2 to 300, still more favorably a number of 2 to 200, yet still more favorably a number of 2 to 150, yet still more favorably a number of 2 to 110) as allows a portion of the (meth)acrylic acid as a starting raw material to remain.

In the above esterification reaction in the present invention, a partial neutralization step as explained below is favorably carried out in the case of carrying out the esterification reaction in the presence of the acid catalyst. In the case of adding water to carry out azeotropic distillation in the step of distilling off the dehydrating solvent after the esterification reaction or in the case of preparing an aqueous solution of the formed esterification product by adding adjustment water after the esterification reaction in order to further carry out the polymerization by using the esterification product, the hydrolysis occurs due to the acid catalyst to cause the deterioration of the quality and performance of the esterification product. Moreover, a product as formed by the hydrolysis (which may hereinafter be referred to simply as hydrolysis product) resides in the esterification product and, in the case where a polymer which is used for such as various dispersants (e.g. cement dispersants) and thickeners is synthesized from this esterification product, the above hydrolysis product becomes an impurity not concerned in the polymerization, and therefore deteriorates the polymerization conversion (and besides, productivity) and also leads to the deterioration of the quality and performance of the polymer. Accordingly, it is favorable to neutralize the acid catalyst with an alkali at a temperature of not higher than 90° C. after the end of the above esterification reaction. Thereby, in a treatment process after the esterification reaction, there can be obtained an esterification product having high purity and high quality without forming the hydrolysis product.

Hereupon, explanations are hereinafter made about favorable modes for carrying out the partial neutralization step.

In the partial neutralization step favorable for the present invention, the acid catalyst and 0 to 60 mol % of the residual (meth)acrylic acid are neutralized with a basic substance, favorably at not higher than 90° C., more favorably in the range of 50 to 0° C., after the end of the esterification reaction.

In the case where the neutralization temperature (liquid temperature of the reaction system) in the above partial neutralization step is higher than 90° C., there are disadvantages in that the basic substance as added acts as a catalyst of the hydrolysis to form the hydrolyzed products in large quantities. Furthermore, at not higher than 50° C., the basic substance does not act as the catalyst of the hydrolysis, but the formation of the hydrolyzed products can perfectly be inhibited. On the other hand, the case of lower than 0° C. is not very desirable in that: the esterification reaction liquid is so viscous that the stirring during the neutralization is difficult, and further a long time is needed for lowering the temperature to a predetermined temperature after the esterification reaction, and further the use of a cooling means (apparatus) is newly needed for lowering the temperature to lower than room temperature, so that the costs increase.

In addition, there is no especial limitation on the basic substance (neutralizing agent) usable in the above partial neutralization step, but that will do if it is a substance which is in the form of a hydroxide $M(OH)_n$, and dissolves in water, and displays the basicity, wherein M denotes such as an alkaline metal, an alkaline earth metal, and an ammonium group. Furthermore, such as alkaline metal carbonates, alkaline metal phosphates, ammonia, and amines are also included in the basic substances as herein referred to. Thus, specific examples of the basic substances include: alkaline metal hydroxides such as sodium hydroxide and potassium hydroxide; alkaline earth metal hydroxides such as magnesium hydroxide and calcium hydroxide; ammonia; and amines. However, such as hydroxides, carbonates, and phosphates of alkaline metals and alkaline earth metals are favorable for the reason that no stench is given out when they are added to cement. Furthermore, in the present invention, these basic substances may be used either alone respectively or in combinations with each other in appropriate ratios.

The acids being neutralized with the above basic substance are the acid catalyst and 0 to 60 mol % of the residual (meth)acrylic acid. Hereupon, the (meth)acrylic acid being neutralized is 0 to 60 mol %, favorably 0 to 55 mol %, more favorably 1 to 55 mol %, still more favorably 1 to 50 mol %, yet still more favorably 5 to 50 mol %, particularly favorably 5 to 40 mol %, of the residual (meth)acrylic acid. In addition, the (meth)acrylic acid being neutralized is favorably not more than 10 weight %, more favorably in the range of 0.01 to 5 weight %, of the (meth)acrylic acid as used in the esterification reaction. Accordingly, the amount of the basic substance (neutralizing agent) as added is favorably in the range of 1.0 to 100 equivalents, more favorably 1.0 to 10 equivalents, still more favorably 1.01 to 2 equivalents, per 1 equivalent of the acid catalyst.

In the case where the (meth)acrylic acid being neutralized is more than 10 weight % of the (meth)acrylic acid as used in the esterification reaction, there are disadvantages in that probably because the polymerization rate of the (meth)acrylic acid in the form of salt is slower than that not in the form of salt, the polymerization conversion in the polymerization with the resultant esterified product is low. Furthermore, in the case where the amount of the basic substance (neutralizing agent) as added is smaller than 1.0 equivalent per 1 equivalent of the acid catalyst, there are disadvantages in that: the acid catalyst cannot wholly be neutralized and, as a result, the hydrolyzed products are formed in large quantities. Or otherwise, also in the case where the amount of the basic substance (neutralizing agent) as added is larger than 100 equivalents per 1 equivalent of the acid catalyst, there are disadvantages in that: a large quantity of the (meth)acrylic acid is neutralized and, as a result, still because the polymerization rate of the (meth)acrylic acid in the form of salt is slower than that not in the form of salt, the polymerization conversion in the polymerization with the resultant esterified product is low.

The reason why an acid to be neutralized is the acid catalyst is that, since, as mentioned above, the acid catalyst strongly reacts with water, which is added after the esterification reaction, to form the hydrolyzed products, it is necessary to inactivate the acid catalyst. Incidentally, as to acid components, there can exist the residual (meth)acrylic acid besides the acid catalyst, but the acid catalyst has greater acid strength than the (meth)acrylic acid and therefore becomes neutralized prior to the (meth)acrylic acid.

Incidentally, although there is no especial limitation on the form of the basic substance being added, the form of aqueous alkali solution can be said to be favorable from the viewpoint of the prevention of the hydrolysis of the esterified product.

Particularly, in the case where the esterification reaction is carried out in the dehydrating solvent, the addition of a large amount of water to the reaction system together with the basic substance is favorable for the prevention of the hydrolysis of the esterified product. That is to say, in a reaction system which does not contain a large amount of water, the basic substance is so difficult to dissolve into the dehydrating solvent as to float in the system in a concentrated state, and this floating of the basic substance in a high concentration does not disappear over a long period of time until being consumed by the neutralization, but causes the hydrolysis of the esterified product. Though depending on the form of the basic substance as used, the amount of the above water as added is usually favorably in the range of 5 to 1,000 weight parts, more favorably 10 to 100 weight parts, apart from the aqueous alkali solution, per 1 weight part of the aqueous alkali solution, for example, in the case where the aqueous alkali solution is added as the neutralizing agent in an amount of 40 to 60%. Hereupon, in the case where the amount of the above water as added is smaller than 5 weight parts, there are disadvantages in that: the basic substance exists heterogeneously in the reaction system for the above reason, therefore the basic substance in a high concentration causes the hydrolysis of the esterified product. In the case where the amount of the above water as added is larger than 1,000 weight parts, there are disadvantages in that: costs become high, for example, because a neutralization tank becomes separately needed for securing the productivity.

In the present invention, because the above esterification reaction is carried out in the dehydrating solvent, it is favorable to distill off the dehydrating solvent from the resultant reaction liquid after the above esterification reaction has been carried out. Furthermore, in the case where the above esterification reaction is carried out in the presence of the acid catalyst, it is favorable to, after the above esterification reaction, neutralize the acid catalyst and further a portion of the (meth)acrylic acid by the aforementioned partial neutralization step and subsequently distill off the dehydrating solvent from the reaction liquid.

Favorable modes for carrying out this step of distilling off the solvent are explained below.

When the dehydrating solvent is distilled off from the reaction liquid in the above step of distilling off the solvent after the esterification reaction has been ended (and also the partial neutralization treatment has been carried out when the occasion demands), the water-soluble polymerization inhibitor is added to the reaction liquid in an amount of favorably not larger than 1,000 ppm, more favorably not larger than 500 ppm, still more favorably not larger than 300 ppm, relative to the amount of the entire raw alkylene oxide addition product and (meth)acrylic acid as used, and particularly favorably the water-soluble polymerization inhibitor is not added. This know-how is based on the findings of the present inventors that: because the water-soluble polymerization inhibitor, which is added originally for the purpose of inhibiting the polymerization, unexpectedly has a polymerization activity though it is weak, the water-soluble polymerization inhibitor causes the polymerization of the unreacted raw materials, the esterification product as the product, or mixtures thereof to thereby form the high-molecular polymers; and the polymerization inhibitor having been added during the esterification reaction functions effectively also when the above dehydrating solvent is distilled off. Accordingly, in the case where the amount of the water-soluble polymerization inhibitor as used is larger than 1,000 ppm relative to the amount of the entire raw alkylene oxide addition product and (meth)acrylic acid as used, the polymerization activity of the above water-soluble polymerization inhibitor causes the generation of high-molecular polymers of not less than 2.0 area %. In the case of utilizing an esterification product including these polymers as a monomer component, there are disadvantages of having an influence on such as cement dispersants including the resultant polymer.

Hereupon, there is no especial limitation on usable water-soluble polymerization inhibitors, and examples thereof include hydroquinone, methoquinone, catechol, and their derivatives (e.g. p-t-butylcatechol), and hydroquinone monomethyl ether. Of the above, the hydroquinone and the methoquinone are favorable because their polymerization activity is comparatively low. In addition, these water-soluble polymerization inhibitors may be used either alone respectively or in combinations with each other.

Incidentally, as to the esterification reaction, favorably, it is carried out under reaction conditions as described in JP-A-060302/1999 (EP 0884290).

Incidentally, after the end of the esterification reaction, there may be used a method in which: the dehydrating solvent is not distilled off before the polymerization reaction step, but the dehydrating solvent is distilled off while being displaced with water in the polymerization reaction step. Specifically, if the esterification reaction product and the polymerization initiator are dropwise added into water heated to the polymerization reaction temperature under a nitrogen atmosphere, then it is possible to carry out a method in which the polymerization reaction is run while the dehydrating solvent is distilled off.

Furthermore, in the present invention, it is possible to carry out the esterification reaction between the alkylene oxide addition product and the (meth)acrylic acid in the presence of the acid catalyst and the polymerization inhibitor without using any dehydrating solvent. In this case, the amount of the (meth)acrylic acid as used (charged) relative to the amount of the alkylene oxide addition product as used (charged) is usually in the range of favorably 3 to 50 mols, more favorably 10 to 40 mols, per 1 mol of the alkylene oxide addition product. Incidentally, the amounts of the acid catalyst and of the polymerization inhibitor are favorably in the aforementioned ranges. After the end of the esterification reaction, the acid catalyst is deactivated by adding thereto a basic substance (neutralizing agent) in an amount of 1.0 to 1.3 equivalent per 1 equivalent of the acid catalyst, and then the unreacted (meth)acrylic acid is distilled off, whereby there can be obtained an esterification reaction product including the (meth)acrylate ester and the residual (meth)acrylic acid. In the case where the (meth)acrylic acid exists in excess of the amount of it desired in the next polymerization reaction step, the unreacted (meth)acrylic acid is distilled off in a period of from after the esterification step till before the polymerization reaction step. As the method for distilling off the unreacted (meth)acrylic acid, there can be applied such as a vacuum distillation method, a water vapor distillation method, or a method in which it is distilled off along with a carrier gas under normal pressure.

On the other hand, in the case where the (meth)acrylate ester is produced by the transesterification reaction between the alkylene oxide addition product and the alkyl ester of (meth)acrylic acid, this transesterification reaction is favorably carried out under reaction conditions as described in JP-A-328346/1997 (EP 0799807).

For obtaining the (meth)acrylate ester by the transesterification reaction, it is enough to carry out the transesterification reaction between the alkylene oxide addition product and the alkyl ester of (meth)acrylic acid such as methyl (meth)acrylate in the presence of the acid catalyst or a basic catalyst, but the use of the basic catalyst is favorable.

The transesterification reaction between the alkylene oxide addition product and the alkyl ester of (meth)acrylic acid is, for example, carried out in the presence of the basic catalyst in the temperature range of 40 to 150° C. for 1 to 20 hours, favorably 1 to 10 hours. In addition, if further necessary, the transesterification reaction may be carried out under a reduced pressure.

In the transesterification reaction between the alkylene oxide addition product and the alkyl ester of (meth)acrylic acid, the molar ratio of alkyl ester of (meth)acrylic acid/alkylene oxide addition product is favorably in the range of 1/1 to 20/1, particularly favorably 1/1 to 10/1. In the case where this molar ratio is less than 1/1, there are disadvantages in that the conversion of the transesterification reaction is unfavorably low. In the case where it exceeds 20/1, there are disadvantages in that such as reaction apparatuses need to be large-sized.

Examples of the basic catalyst to be used in the transesterification reaction include: alkaline metal hydroxides such as sodium hydroxide, potassium hydroxide, and lithium hydroxide; alkaline earth metal hydroxides such as calcium hydroxide and magnesium hydroxide; alkaline metal alkoxides such as sodium methoxide, sodium ethoxide, sodium isopropoxide, potassium methoxide, potassium ethoxide, and potassium isopropoxide; and such strongly basic ion-exchange resins as possess an ammonium salt type amine as an exchange group. Among these basic catalysts, the alkaline metal hydroxides and the alkaline metal alkoxides are favorable, and above all, the sodium hydroxide or sodium methoxide is particularly favorable. The amount of the basic catalyst to be used is favorably in the range of 0.01 to 20% by weight, particularly favorably 0.1 to 10% by weight, based on the alkylene oxide addition product. In the case where this amount is smaller than 0.01% by weight, the catalytic effect will not be fully manifested. And, even if an amount larger than 20% by weight is used, it will merely be uneconomical. Although there can be a method in which the basic catalyst is charged to the reaction system all at once or added to the reaction system continuously or piecemeal, yet the continuous or piecemeal addition is preferable for preventing the inactivation of the surface of the catalyst in the reaction system wherein this inactivation deactivates the catalysis.

The transesterification reaction can be carried out either batchwise or continuously. For example, in the batch reaction, the completion of the reaction can be confirmed from a fact that the distillation of the alkyl alcohol which is induced by gradually elevating the internal temperature has ceases to proceed, despite the reach to the allowable temperature. Then, the (meth)acrylate ester aimed at can be obtained by distilling off the raw alkyl ester of (meth)acrylic acid under a reduced pressure.

Production Process for (Meth)Acrylic Copolymer

As is mentioned above, when the (meth)acrylate ester is produced by carrying out the esterification reaction between the alkylene oxide addition product and the (meth)acrylic acid or the transesterification reaction between the alkylene oxide addition product and the alkyl ester of the (meth)acrylic acid, the use of the alkylene oxide addition product as obtained by the present invention production process for the alkylene oxide addition product can prevent the formation of further by-products (e.g. diesters) in the esterification reaction or the transesterification reaction, wherein the further by-products (e.g. diesters) are derived from the aforementioned by-products (e.g. poly(alkylene oxide)). Then, in the case where the (meth)acrylic copolymer is produced by the polymerization reaction of the monomer component including the (meth)acrylate ester in which the content of the by-products (e.g. diesters) as impurities is suppressed to low, this copolymer is useful for various uses and, for example, can display the excellent performance as a cement admixture.

That is to say, the present invention production process for a (meth)acrylic copolymer comprises the step of carrying out a polymerization reaction of a monomer component including a (meth)acrylate ester to thereby obtain the (meth)acrylic copolymer;

with the production process being characterized in that:

the (meth)acrylate ester is a product obtained by a process including the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid;

wherein the alkylene oxide addition product from the hydroxyl-group-containing saturated compound is a product obtained by a process including: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

The monomer component usable in the present invention production process for a (meth)acrylic copolymer includes the above specific (meth)acrylate ester as an essential component, and may further include at least one kind of other copolymerizable monomer.

Favorable specific examples of the monomer component usable in the present invention production process for a (meth)acrylic copolymer include a monomer component as obtained by mixing the above other copolymerizable monomer into an aqueous solution resultant from the esterification reaction or transesterification reaction as obtained by the above specific production process.

In the aqueous solution resultant from the esterification reaction or transesterification reaction as obtained by the above specific production process, there is included the above specific (meth)acrylate ester as an essential component, and sometimes there is further included the residual (meth)acrylic acid.

In the monomer component usable in the present invention production process for a (meth)acrylic copolymer, the content of the monomer component (the total of the (meth)acrylate ester and the residual (meth)acrylic acid) in the aqueous solution resultant from the esterification reaction or transesterification reaction as obtained by the above specific production process is favorably not less than 30 weight %, more favorably not less than 50 weight %, still more favorably not less than 70 weight %, yet still more favorably not less than 80 weight %, particularly favorably not less than 90 weight %, for the purpose of sufficiently displaying the effects of the present invention.

In addition, in the monomer component usable in the present invention production process for a (meth)acrylic copolymer, the content of the above specific (meth)acrylate ester depends upon the amount of the above residual (meth)acrylic acid, but is favorably not less than 10 weight %, more favorably not less than 20 weight %, still more favorably not less than 30 weight %, yet still more favorably not less than 50 weight %, particularly favorably not less than 70 weight %.

There is no especial limitation on the other copolymerizable monomer usable as a monomer component. However, favorable examples thereof include unsaturated carboxylic monomers, unsaturated monomers having a polyalkylene glycol chain, and such other unsaturated monomers as exemplified below.

There is no especial limitation on the aforementioned unsaturated carboxylic monomers if they are monomers having an unsaturated group and a carboanion-formable group. Examples thereof include unsaturated monocarboxylic monomers and unsaturated dicarboxylic monomers.

Examples of the unsaturated monocarboxylic monomers include: acrylic acid, methacrylic acid, and crotonic acid; and their monovalent metal salts, divalent metal salts, ammonium salts, and organic amine salts.

There is no especial limitation on the unsaturated dicarboxylic monomers if they are monomers having one unsaturated group and two carboanion-formable groups per molecule. Examples thereof include: maleic acid, itaconic acid, citraconic acid, and fumaric acid; and their monovalent metal salts, divalent metal salts, ammonium salts, and organic amine salts, or acid anhydrides.

In addition, besides the unsaturated monocarboxylic monomers and the unsaturated dicarboxylic monomers, there can be cited other examples as follows: half esters between the unsaturated dicarboxylic monomers and alcohols having 1 to 22 carbon atoms, half amides between the unsaturated dicarboxylic monomers and amines having 1 to 22 carbon atoms, half esters between the unsaturated dicarboxylic monomers and glycols having 2 to 4 carbon atoms, and half amides between maleamic acid and glycols having 2 to 4 carbon atoms.

There is no especial limitation on the unsaturated monomers having a polyalkylene glycol chain if they are monomers having an unsaturated group and the polyalkylene glycol chain. Examples thereof include polyalkylene glycol ester monomers and polyalkylene glycol ether monomers.

There is no especial limitation on the above polyalkylene glycol ester monomers if they are monomers having a structure such that the unsaturated group and the polyalkylene glycol chain are bonded together through an ester bond. Examples thereof include polyalkylene glycol unsaturated carboxylate ester compounds. Favorable of the above are (alkoxy)polyalkylene glycol mono(meth)acrylate esters.

There is no especial limitation on the above polyalkylene glycol ether monomers if they are monomers having a structure such that the polyalkylene glycol chain has added to an alcohol having the unsaturated group. Examples thereof include (meth)allyl alcohol alkylene oxide addition products, 3-buten-1-ol alkylene oxide addition products, isoprene alcohol (3-methyl-3-buten-1-ol) alkylene oxide addition products, and 3-methyl-2-buten-1-ol alkylene oxide addition products.

Such unsaturated monomer having a polyalkylene glycol chain is, for example, favorably a compound as represented by a general formula (1) below.

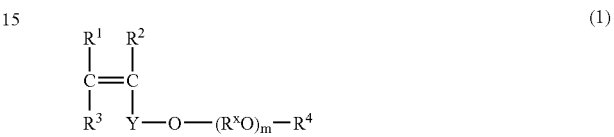

In the above general formula (1): $R^1$, $R^2$ and $R^3$ are either identical with or different from each other, and represent a hydrogen atom or a methyl group; $R^4$ represents a hydrogen atom or a hydrocarbon group having 1 to 20 carbon atoms; $R^xO$ represents one kind of oxyalkylene group having 2 to 18 carbon atoms or a mixture of at least two kinds of such oxyalkylene groups; m represents a molar-number-average degree of polyaddition of the oxyalkylene group as represented by $R^xO$ and is a number of 1 to 300; and Y represents —$CH_2$—, —$(CH_2)_2$—, —$C(CH_3)_2$— or —CO—. In the case where Y=—CO—, the general formula (1) represents the polyalkylene glycol ester monomers and, in the case where Y=—$CH_2$—, —$(CH_2)_2$— or —$C(CH_3)_2$—, the general formula (1) represents the polyalkylene glycol ether monomers.

The oxyalkylene group as represented by the —$(R^xO)$— in the above general formula (1) is an alkylene oxide addition product having 2 to 18 carbon atoms, and such an alkylene oxide addition product structure is a structure as formed from at least one alkylene oxide, such as ethylene oxide, propylene oxide, and butylene oxide. In the case where the alkylene oxide addition product is formed from at least two alkylene oxides, their addition form may be any of such as random addition, block addition, and alternating addition.

The m, which is a molar-number-average degree of polyaddition of the oxyalkylene group as represented by the above $R^xO$, is a number of 1 to 300. In the case where the m is larger than 300, the polymerizability of the monomer is low. The m is favorably in the range of 2 to 300, more favorably 10 to 250, still more favorably 20 to 150. Incidentally, the molar-number-average degree of polyaddition means an average value of the mols of the above organic group as added in 1 mol of the monomer.

In the case where the above $R^4$ has more than 20 carbon atoms, the hydrophobicity of the polycarboxylic copolymer is too strong to obtain good dispersibility. A favorable form of the $R^4$ is, in view of the dispersibility, a hydrogen atom or a hydrocarbon group having 1 to 20 carbon atoms. More favorably, it is a hydrogen atom or a hydrocarbon group having 1 to 10 carbon atoms, still more favorably a hydrogen atom or a hydrocarbon group having 1 to 3 carbon atoms, particularly favorably a hydrogen atom or a hydrocarbon group having 1 to 2 carbon atoms.

There is no especial limitation on the above polyalkylene glycol ether monomers if they are such monomers as mentioned above. Examples thereof include polyethylene glycol monoallyl ether, polyethylene glycol mono(2-methyl-2-propenyl) ether, polyethylene glycol mono(3-methyl-3-butenyl) ether, polyethylene glycol mono(3-methyl-2-butenyl) ether, polyethylene glycol mono(1,1-dimethyl-2-propenyl) ether, polyethylene polypropylene glycol mono(3-methyl-3-butenyl) ether, methoxypolyethylene glycol mono(3-methyl-3-butenyl) ether, and methoxypolyethylene glycol monoallyl ether.

Examples of the above esterification product include (alkoxy)polyethylene glycol (poly)(alkylene glycol having 2 to 4 carbon atoms) (meth)acrylate esters, namely, such as methoxypolyethylene glycol mono(meth)acrylate, methoxy{polyethylene glycol (poly)propylene glycol} mono(meth)acrylate, ethoxypolyethylene glycol mono(meth)acrylate, and butoxypolyethylene glycol mono(meth)acrylate.

As to the above polyalkylene glycol ester monomers, besides the (alkoxy)polyalkylene glycol mono(meth)acrylate esters, there can be cited their other examples as follows: (alkoxy)polyalkylene glycol monomaleate esters and (alkoxy)polyalkylene glycol dimaleate esters. Examples of such monomers include: half esters and diesters between the above unsaturated dicarboxylic monomers and alkylpolyalkylene glycols as obtained by causing 1 to 300 mols of oxyalkylenes having 2 to 4 carbon atoms to add to alcohols having 1 to 22 carbon atoms or amines having 1 to 22 carbon atoms; half esters and diesters between the above unsaturated dicarboxylic monomers and polyalkylene glycols of which the molar-number-average degree of polyaddition of glycols having 2 to 4 carbon atoms is in the range of 2 to 300; (poly)alkylene glycol di(meth)acrylates, such as triethylene glycol di(meth)acrylate, (poly)ethylene glycol di(meth)acrylate, polypropylene glycol di(meth)acrylate, and (poly)ethylene glycol (poly)propylene glycol di(meth)acrylate; and (poly)alkylene glycol dimaleates, such as triethylene glycol dimaleate and polyethylene glycol dimaleate.

Examples of the aforementioned other unsaturated monomers include: styrene family members, such as styrene, bromostyrene, chlorostyrene, and methylstyrene; dienes, such as 1,3-butadiene, isoprene, and isobutylene; (meth)acrylate esters, such as methyl (meth)acrylate, ethyl (meth)acrylate, butyl (meth)acrylate, pentyl (meth)acrylate, hexyl (meth)acrylate, decyl (meth)acrylate, and lauryl (meth)acrylate; α-olefins, such as hexene, heptene, and decene; alkyl vinyl ethers, such as methyl vinyl ether, ethyl vinyl ether, and butyl vinyl ether; vinyl esters such as vinyl acetate; allyl esters such as allyl acetate; difunctional (meth)acrylates such as hexanediol di(meth)acrylate; unsaturated sulfonic acids, such as vinylsulfonates, (meth)allylsulfonates, and styrenesulfonic acid, and their monovalent metal salts, divalent metal salts, ammonium salts, and organic amine salts; unsaturated amides such as (meth)acrylamide; allyl family members such as allyl alcohol; unsaturated amino compounds such as dimethylaminoethyl (meth)acrylate; vinyl ethers, such as methoxypolyethylene glycol monovinyl ether, polyethylene glycol monovinyl ether; and (meth)acrylate compounds, such as hydroxyethyl (meth)acrylate, hydroxypropyl (meth)acrylate, methoxyethyl (meth)acrylate, ethoxyethyl (meth)acrylate, butoxyethyl (meth)acrylate, and methoxypropyl (meth)acrylate.

As is mentioned above, the monomer component as used in the present invention production process for a (meth)acrylic copolymer includes monomer components as contained in the aqueous solution resultant from the esterification reaction as obtained by the present invention production process for a (meth)acrylate ester, namely, the specific (meth)acrylate ester (essential component) and the residual (meth)acrylic acid (optional component), and may further include another copolymerizable monomer as an optional component.

The compositional ratio of the monomers is favorably (unsaturated carboxylate ester monomer having polyalkylene glycol chain)/(unsaturated carboxylic monomer)/(other unsaturated monomer)=(1 to 99)/(1 to 99)/(0 to 60), more favorably (5 to 99)/(2 to 80)/(0 to 40), still more favorably (10 to 95)/(5 to 50)/(0 to 25), in terms of weight %. Hereupon, the above unsaturated carboxylate ester monomer having a polyalkylene glycol chain includes the specific (meth)acrylate ester, obtained by the present invention production process, as an essential component in an amount of favorably not smaller than 40 weight %, more favorably not smaller than 50 weight %, still more favorably not smaller than 60 weight %, yet still more favorably not smaller than 70 weight %, particularly favorably not smaller than 80 weight %, most favorably not smaller than 90 weight %. In addition, the above unsaturated carboxylic monomer may include the residual (meth)acrylic acid as contained in the aqueous solution resultant from the esterification reaction as obtained by the present invention production process for a (meth)acrylate ester.

A favorable way for obtaining the (meth)acrylic copolymer by the present invention production process is to carry out the polymerization of the aforementioned monomer component by using a polymerization initiator. The polymerization can be carried out by methods such as polymerization in a solvent or bulk polymerization. The polymerization in a solvent may be carried out either in a batch manner or in a continuous manner. Examples of the solvent as used then include: water; lower alcohols, such as methyl alcohol, ethyl alcohol, and 2-propanol; aromatic or aliphatic hydrocarbons, such as benzene, toluene, xylene, cyclohexane, and n-hexane; ester compounds such as ethyl acetate; and ketone compounds, such as acetone and methyl ethyl ketone. The water, the methyl alcohol, the ethyl alcohol, and the 2-propanol are particularly effective in view of: the solubility of the raw monomer component and the copolymer as obtained; and the handling when this copolymer is used.

When the polymerization is carried out in a water medium, what are used as the polymerization initiators are water-soluble polymerization initiators such as: persulfates of ammonium or alkaline metals; or hydrogen peroxide. In this case, jointly therewith, there may be used promoters, such as sodium hydrogensulfite, Mohr's salt, ascorbic acid (salts), erysorbic acid (salts), and Rongalit.

In the present invention, for avoiding the deposit of salts (e.g. sodium sulfate) into products after the polymerization, it is favorable that a redox polymerization initiator including hydrogen peroxide and a reducing agent is used as the aforementioned polymerization initiator.

That is to say, a favorable mode of the present invention process for producing the (meth)acrylic copolymer is a process for producing the (meth)acrylic copolymer which comprises the step of carrying out polymerization of the (meth)acrylic acid and the (meth)acrylate ester with a polymerization initiator, and is characterized by using the redox polymerization initiator including hydrogen peroxide and the reducing agent as the polymerization initiator, and further characterized in that the amount of the hydrogen peroxide as used is in the range of 0.01 to 30 mol % relative to the total of the aforementioned monomer component.

The use of the redox polymerization initiator can rapidly promote the polymerization reaction even if the polymerization temperature is low. In addition, the use of the hydrogen peroxide and the limitation of the amount of the hydrogen peroxide as used into the range of 0.01 to 30 mol % relative to the total of the aforementioned monomer component can lessen the oligomer content and inhibit the coloring.

As to the polymerization initiator as used when the (meth)acrylic copolymer is produced, hitherto, the peroxide has been generally used alone, and the redox polymerization initiator has not been used. In the case where a combination of ammonium persulfate/sodium hydrogensulfite is used as the redox polymerization initiator, salts (e.g. sodium sulfate) are deposited in products after the polymerization, and therefore the purity is lowered. On the other hand, in the case where the peroxide is used, it is necessary, for the enhancement of the reaction efficiency, to make the polymerization temperature higher than that in the case where the redox polymerization initiator is used. Therefore, impurities due to the high-temperature reaction are easily formed and, as the case may be, the resultant products are colored. However, as to the above favorable mode of the present invention process for producing the (meth)acrylic copolymer, it has been found out that: because the redox polymerization initiator including hydrogen peroxide and the reducing agent is used and particularly because the amount of the hydrogen peroxide as used is limited into the range of 0.01 to 30 mol %, more favorably 0.1 to 20 mol %, most favorably 0.5 to 10 mol %, relative to the total of the aforementioned monomer component, the polymerization can be carried out in a short time even at a low temperature, and further there can be produced the (meth)acrylic copolymer which is little colored and also simultaneously has a low oligomer content. In the case where the amount of the hydrogen peroxide as used is smaller than 0.01 mol % relative to the total of the aforementioned monomer component, there are disadvantages in that a large amount of monomer remains unreacted. On the other hand, in the case where the amount of the hydrogen peroxide as used exceeds 30 mol %, there are disadvantages in that such a case results in obtaining a (meth)acrylic copolymer containing a large amount of oligomer portions.

Examples of the reducing agent include: salts of metals being in a lower-valence state (e.g. iron (II), tin (II), titanium (III), chromium (II), V (II), and Cu (II)), which are represented by Mohr's salt; amine compounds or their salts, such as monoethanolamine, diethanolamine, triethanolamine, hydroxylamine, hydroxylamine hydrochloride, and hydrazine; alkaline-metal sulfite salts, such as sodium sulfite, sodium hydrogensulfite, and metadisulfite salts; lower oxides or their salts, such as hypophosphorous acid, sodium hypophosphite, sodium hydrosulfite, and sodium dithionite; organic compounds having a group (e.g. an —SH group, an —SO$_2$H group, an —NHNH$_2$ group, and a —COCH(OH)— group) or their salts, such as sodium formaldehydesulfoxylate and sodium hydroxymethanesulfinate dihydrate; invert sugars, such as D-fructose and D-glucose; thiourea compounds, such as thiourea and thiourea dioxide; and L-ascorbic acid, sodium L-ascorbate, L-ascorbate esters, erysorbic acid, sodium erysorbate, and erysorbate esters. In the present invention, it is particularly favorable to use organic reducing agents and, of them, the L-ascorbic acid (salts) or erysorbic acid (salts) is particularly favorable. Incidentally, when the above reducing agent is used, it is also permissible to use promoters (e.g. amine compounds) jointly therewith.

In the above favorable mode of the present invention process for producing the (meth)acrylic copolymer, the amount of the hydrogen peroxide as used is in the range of 0.01 to 30 mol % relative to the aforementioned monomer component, but the amount of the aforementioned reducing agent as used is favorably in the range of 0.1 to 500 mol %, more favorably 1 to 200 mol %, most favorably 10 to 100 mol %, relative to the hydrogen peroxide. In the case where the amount of the aforementioned reducing agent is smaller than 0.1 mol %, there are disadvantages in that active radicals are not sufficiently generated, so a large amount of monomer remains unreacted. On the other hand, in the case where the amount of the aforementioned reducing agent exceeds 500 mol %, there are disadvantages in that a large amount of the reducing agent remains, and further in that crystals derived from the reducing agent may be deposited when the resultant (meth)acrylic copolymer is preserved in a high concentration after being neutralized.

When the polymerization is carried out in a water medium, the polymerization temperature is fittingly determined according to the polymerization initiator as used, but it is favorably in the range of 0 to 95° C., more favorably 30 to 90° C., particularly favorably 50 to 85° C.

In addition, in the case of the polymerization in which the lower alcohols, the aromatic hydrocarbons, the aliphatic hydrocarbons, the ester compounds, or the ketone compounds are used as the solvent, what are used as the polymerization initiators are, for example, as follows: peroxides such as benzoyl peroxide and lauroyl peroxide; hydroperoxides such as cumene hydroperoxide; and azo compounds such as azobisisobutyronitrile. In this case, jointly therewith, promoters such as amine compounds may be used. Furthermore, in the case of using a solvent as obtained by mixing the water and the lower alcohol together, there can be used those which are selected appropriately from among the above various polymerization initiators or from among their combinations with the above various promoters. The polymerization temperature is determined appropriately from the solvent and polymerization initiator as used, but the polymerization is usually carried out in the temperature range of 0 to 120° C.

The bulk polymerization is carried out, usually in the temperature range of 50 to 200° C., using the polymerization initiators, for example, the following: peroxides such as benzoyl peroxide and lauroyl peroxide; hydroperoxides such as cumene hydroperoxide; and azo compounds such as azobisisobutyronitrile.

In addition, in order to adjust the molecular weight of the copolymer as obtained, there may be used chain transfer agents, such as hypophosphorous acid (salts) and thiols. Examples of the thiol chain transfer agents as used in this case include mercaptoethanol, thioglycerol, thioglycolic acid, 2-mercaptopropionic acid, 3-mercaptopropionic acid, thiomalic acid, octyl thioglycolate, octyl 3-mercaptopropionate, octylmercaptan, and dodecylmercaptan. These can be used either alone respectively in combinations with each other. Furthermore, in order to adjust the molecular weight of the copolymer, it is also effective to use, as the monomer component, high chain-transferable monomers such as (meth)allylsulfonic acid (salts).

In the present invention, the polymerization reaction can be carried out under conditions where the pH of the reaction liquid is in the range of 1.5 to 3.2 (but not including 3.2) during the polymerization reaction. If the pH is not less than 1.5, then it is possible to prevent the hydrolysis reaction of the (meth)acrylate ester from taking place during the polymerization reaction. Whether the pH of the esterification reaction product is out of the range of 1.5 to 3.2 (but not including 3.2) or within this range, an acid or base can be added for pH adjustment, if desired. Incidentally, in the case where the persulfate is used as the polymerization initiator, an acidic initiator-decomposed product is formed, therefore the pH during the polymerization reaction can easily be adjusted into the above range.

Examples of the acid, as used for the pH adjustment, include phosphoric acid, sulfuric acid, nitric acid, alkyl phosphates, alkyl sulfates, alkylsulfonic acids, alkylbenzenesulfonic acids, and benzenesulfonic acid. Of these, the phosphoric acid is preferable because it has an pH-buffering action and therefore can easily adjust the pH into the predetermined range, and can prevent the polymerization reaction system from bubbling. Examples of the base include sodium hydroxide and potassium hydroxide.

In the present invention, it is favorable that the polymerization reaction is carried out under conditions where the pH of the reaction liquid of the polymerization reaction is in the range of 3.2 to 7.0 by carrying out the above partial neutralization after the esterification reaction. If the pH of the reaction liquid of the polymerization reaction is put in the range of 3.2 to 7.0, there are advantages in that the polymerization conversion of the polymerization reaction can be enhanced. In addition, if the pH of the reaction liquid of the polymerization reaction is put in the range of 3.2 to 7.0, there are advantages in that the corrosion of the polymerization apparatus (vessel) can be prevented.

The range of the above pH is more favorably pH 3.3 to 7.0, still more favorably pH 3.5 to 6.5, particularly favorably pH 4.0 to 5.2.

In the case of deviation from the above pH range, the polymerization conversion of the polymerization reaction is low, and further the corrosion of the polymerization apparatus (vessel) is so much as to cost a lot uneconomically. Incidentally, the pH measurement in the present invention is carried out by a method in which the pH of a reaction liquid sampled from the polymerization reaction liquid during the actual polymerization reaction is measured at 25° C., and the sampled mixture is adjusted to 25° C., and then the pH of this mixture at 25° C. is measured with a pH meter.

Thus, particularly favorable modes of the present invention production processes for the alkylene oxide addition product, the (meth)acrylate ester, and the (meth)acrylic copolymer are as follows.

(1) Production Process for Alkylene Oxide Addition Product:

A production process for an alkylene oxide addition product, comprising: the initial step of causing the alkylene oxide to add to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product wherein the hydroxyl-group-containing saturated compound is a saturated monohydric alcohol or monohydric phenol which contains 1 to 30 carbon atoms and has a water content of not more than 6,000 ppm; and the molar-degree-of-polyaddition-adjusting step of causing the alkylene oxide to further add to the alkylene oxide low-mol-addition product as obtained in the initial step; wherein a portion of the entirety of the alkylene oxide low-mol-addition product as obtained in the initial step is used in the molar-degree-of-polyaddition-adjusting step.

(2) Production Process for (Meth)Acrylate Ester:

A production process for a (meth)acrylate ester, comprising the steps of: carrying out an esterification reaction of "p" parts by weight of the aforementioned alkylene oxide addition product and "q" parts by weight of (meth)acrylic acid in the presence of an acid catalyst under conditions satisfying such a relationship of $[(p/n^{1/2})/q] \times 100 \leq 200$ (where n is a molar-number-average degree of polyaddition of the oxyalkylene group and is a number of 1 to 300, more favorably a number of 2 to 300, still more favorably a number of 2 to 200, yet still more favorably a number of 2 to 150, yet still more favorably a number of 2 to 110) as allows a portion of the (meth)acrylic acid as a starting raw material to remain; and then neutralizing the acid catalyst and 0 to 60 mol % of the residual (meth)acrylic acid with a basic substance after the esterification reaction.

(3) Production Process for (Meth)Acrylic Copolymer:

<1> A production process for a (meth)acrylic copolymer, comprising the step of copolymerizing (meth)acrylic acid and the (meth)acrylate ester under conditions where the pH of the polymerization reaction liquid is in the range of 1.5 to 3.2 (but not including 3.2). Incidentally, as the polymerization initiator, the persulfate is favorably used.

Or

<2> A production process for a (meth)acrylic copolymer, comprising the step of copolymerizing (meth)acrylic acid and the (meth)acrylate ester under conditions where the redox polymerization initiator including hydrogen peroxide and the organic reducing agent (favorably, L-ascorbic acid (salts) or erysorbic acid (salts)) is used as the polymerization initiator and where the pH of the polymerization reaction liquid is in the range of 3.2 to 7.0.

The (meth)acrylic copolymer as obtained in the above way is, as aforementioned, useful for various uses and is, for example, even as it is, favorably used as a cement admixture. However, in such a case where its solubility in water is lacking, it is favorable, for enhancing the solubility in water and thereby handling the copolymer in the form of its aqueous solution containing no organic solvent, that, as the cement admixture, there is used a polymer salt as obtained by further neutralizing the copolymer with alkaline substances, for example, the following: inorganic substances, such as hydroxides, chlorides, and carbonate salts of monovalent metals and divalent metals; ammonia; and organic amines (favorably, hydroxides of monovalent metals, such as sodium hydroxide and potassium hydroxide).

The weight-average molecular weight of the (meth)acrylic copolymer as obtained in the above way is favorably in the range of 1,000 to 500,000, more favorably 3,000 to 300,000, still more favorably 5,000 to 100,000, yet still more favorably 7,000 to 80,000, in terms of polyethylene glycols by gel permeation chromatography (hereinafter referred to as "GPC"). In the case where the weight-average molecular weight is smaller than 1,000 and in the case where the weight-average molecular weight is larger than 500,000, there are disadvantages in that the dispersibility is low. Conditions for measurement of the weight-average molecular weight are as follows.

Conditions for measurement of weight-average molecular weight:

| | |
|---|---|
| Instrument: | Waters LCM1 |
| Detector: | Waters 410 |
| Eluent: | sort: acetonitrile/water = 40/60 vol %, pH 6.0 flow rate: 0.8 ml/min |
| Columns: | sort: TSK-GEL G4000SWXL + G3000SWXL + G2000SWXL + GUARD COLUMN, produced by Tosoh Corporation 7.8 × 300 mm and 6.0 × 40 mm respectively |
| Calibration curve: | standardized by polyethylene glycols |
| Column temperature: | 35° C. |
| Analytic software: | MILLENNIUM Ver. 2.18, produced by Japan Waters Co., Ltd. |

(Uses):

As to the (meth)acrylic copolymer as obtained by the present invention production process, a raw material for it is the (meth)acrylate ester as obtained by the present invention production process, and further this (meth)acrylate ester is a product from the alkylene oxide addition product as obtained by the present invention production process. The above (meth)acrylic copolymer is suitable for various uses, such as pigment dispersants (e.g. dispersants for pigments for coated paper, dispersants for pigments for filling into paper, dispersants for pigments for aqueous paints, dispersants for pigments for aqueous inks), chelating agents, scale inhibitors, detergent builders, polymer surfactants, emulsifiers, cement admixtures, deinking agents for recycling used papers, various dye dispersants, agricultural-chemicals dispersants, cotton-refining cleaners, and coal dispersants. Particularly, the above (meth)acrylic copolymer displays extremely excellent performances in the ability to disperse various inorganic and organic pigments into a mixed solvent of water and a polar solvent (e.g. isopropyl alcohol and ethylene glycol) and in the ability to chelate or disperse multivalent metal ions of such as calcium, magnesium, zinc, and aluminum.

The cement admixture can be cited as a particularly favorable use of the (meth)acrylic copolymer as obtained by the present invention production process, and this (meth)acrylic copolymer can be used as an admixture for various hydraulic materials, namely, cement and hydraulic materials other than the cement (e.g. gypsum).

Specific examples of hydraulic compositions include cement paste, mortar, concrete, and plaster, wherein the hydraulic compositions include the above cement admixture, the hydraulic material, and water and, if necessary, further include a fine aggregate (e.g. sand) and a coarse aggregate (e.g. cracked stone). The most common of the above hydraulic compositions is a cement composition using the cement as the hydraulic material and including at least the cement admixture, the cement, and the water. However, there is no especial limitation on the cement as used. Examples thereof include: portland cement (normal types, high-early-strength types, ultra-high-early strength types, moderate-heat types, sulfate-salt-resistant types, and their respective low-alkali types); various mixed cements (blast furnace cement, silica cement, and fly ash cement); white portland cement; alumina cement; ultra-fast-hardening cement (1-clinker fast-hardening cement, 2-clinker fast-hardening cement, and magnesium phosphate cement); grout cement; oil-well cement; low-calorific cement (low-calorific type blast furnace cement, fly-ash-mixed low-calorific type blast furnace cement, and belite high-content cement); ultra-high-strength cement; cement type solidifiers; and ecological cement (cement produced from at least one raw material selected from the group consisting of ash from an urban garbage furnace and ash from an sewage garbage furnace). Furthermore, there may be added fine powders (e.g. blast furnace slag, fly ash, cinder ash, clinker ash, husk ash, silica fume, silica powder, and limestone powder) or gypsum. In addition, refractory aggregates (e.g. silica, clay, zircon, high alumina, silicon carbide, carbon, chromate, chrome magnesite, and magnesia) can be used as other aggregates besides gravel, cracked stones, water-granulated slag, and recycled aggregates.

In the case of producing the cement composition, there is no especial limitation on its unit amount of water and amount of cement as used per 1 $m^3$ of the cement composition and on the water/cement ratio. Favorably, there are recommended the following: the unit amount of water=100 to 185 $kg/m^3$ (more favorably 120 to 175 $kg/m^3$); the amount of cement as used=250 to 800 $kg/m^3$ (more favorably 270 to 800 $kg/m^3$); and the water/cement ratio (weight ratio)=0.1 to 0.7 (more favorably 0.2 to 0.65). These ranges can widely be used from a poor content to a rich content, and are effective to both a high-strength concrete having a large unit amount of cement and a poor-content concrete having a unit amount of cement of not larger than 300 $kg/m^3$.

In the case of producing the cement composition, there is no especial limitation on the mixing ratio of the cement admixture according to the present invention. However, in the case of using the cement admixture for such as mortar and concrete using hydraulic cement, the cement admixture may be added in such an amount that its mixing ratio is favorably in the range of 0.01 to 5.0%, more favorably 0.02 to 2.0%, still more favorably 0.05 to 1.0%, in terms of nonvolatile content of the copolymer, relative to the weight of the cement. This addition gives various favorable effects such as the reduction of the unit amount of water, the increase of the strength, and the enhancement of the durability. In the case where the above mixing ratio is less than 0.01%, the performance is not sufficient. On the other hand, even if the cement admixture is used in such a large amount that the mixing ratio is more than 5.0%, the effects substantially reach the uppermost limit and there are disadvantages also in view of the economy. In addition, the cement admixture is effective to such as concrete for secondary concrete products (precast concrete), centrifugation-molding concrete, vibration-tightening concrete, vapor-aging concrete, and spraying concrete. Furthermore, the cement admixture is effective also to mortar and concrete to which high flowability is demanded, such as medium-flowing concrete (concrete showing a slump value of 22 to 25 cm), high-flowing concrete (concrete showing a slump value of not less than 25 cm and a slump flow value of 50 to 70 cm), self-filling concrete, and self-leveling materials.

The (meth)acrylic copolymer as obtained by the present invention production process can, as it is in the form of aqueous solution, be used as a major component of the cement admixture. However, this (meth)acrylic copolymer may be used after having been powdered by neutralizing this copolymer with hydroxides of divalent metals such as calcium and magnesium to produce a multivalent metal salt and thereafter drying this multivalent metal salt, or by supporting the above copolymer on inorganic powders such as silica fine powder and thereafter drying the resultant supported powder, or by drying and solidifying the above copolymer into the shape of a thin film on a support with a drum-type, disc-type, or belt-type dryer and thereafter pulverizing the resultant dried and solidified product.

As to the (meth)acrylic copolymers as obtained by the present invention production process, each of these copolymers alone or their mixture can, as it is in the form of aqueous solution, be used as a major component of the cement admixture, or they may be used in combinations with publicly known other cement admixtures. Examples of such publicly known cement admixtures include conventional ones such as: cement dispersants, air-entraining agents, cement humectants, swelling materials, waterproofing agents, retarders, accelerators, water-soluble high-molecular substances, separation-diminishing agents, thickeners, flocculants, dry-shrinkage-diminishing agents, strength-enhancing agents, self-leveling agents, anticorrosives, coloring agents, mildew-proofing agents, curing promotors, and defoaming agents.

Examples of the above publicly known cement dispersants, suited for the combined use, include: sulfonic dispersants containing a sulfonic acid group in their molecules such as naphthalenesulfonic acid-formaldehyde condensates, melaminesulfonic acid-formaldehyde condensates, ligninsulfonic acid salts and polystyrenesulfonic acid salts; and polycarboxylic dispersants which are polymers containing a (poly)oxyalkylene group and a carboxyl group in their molecules. Incidentally, as to their combination composition, it greatly differs according to whether the aimed additional function is present or not, and it ranges over various modes from such that the above copolymer component is contained either in an amount of 100 weight % (entire amount) or as a main component to such that an appropriate amount of the above copolymer component is added as a high additional value component to conventional cement dispersants. Therefore, the combination composition cannot definitely be specified. However, the amount of the (meth)acrylic copolymer as combined is usually in the range of 5 to 100 weight %, favorably 50 to 100 weight %, of all components.

In addition, hydroxycarboxylic acids (salts) such as gluconic acid (salts) are favorable as the curing retarders; and oxyalkylene type defoaming agents such as (poly)oxyalkylene alkyl ethers, acetylene ethers, and (poly)oxyalkylene-alkylamines are favorable as the defoaming agents. When adjusting the air content in mortar or concrete, it is favorable that the air-entraining agents and the oxyalkylene type defoaming agents are used together.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the examples. Incidentally, unless otherwise noted, the units "part(s)" and "%" in the examples and the comparative examples denote "weight part(s)" and "weight %" respectively.

EXAMPLE 1

Production (1) of Alkylene Oxide Addition Product

A stainless high-pressure reactor, as equipped with a thermometer, a stirrer, and a nitrogen- and an alkylene oxide-introducing tube, was charged with 575 parts of methanol (water content=150 ppm) and 4 parts of sodium hydroxide, and then air in the reactor was displaced with nitrogen under stirring, and then the contents of the reactor were heated to 90° C. under a nitrogen atmosphere. Next, with this 90° C. kept under a safe pressure (conditions where in the reactor the partial pressure of nitrogen was constantly higher than that of ethylene oxide), 790 parts of ethylene oxide was introduced into the reactor in 3 hours.

Thereafter, the reaction temperature was raised to 120° C. and, with this 120° C. kept under the safe pressure, 7,110 parts of ethylene oxide was introduced into the reactor in 3 hours, and then that temperature was kept for 1 hour to complete the alkylene oxide addition reaction, thus obtaining 8,479 parts of an alkylene oxide addition product as formed by addition of 10 mols on average of ethylene oxide to methanol (hereinafter this product is referred to as MEO-10).

Next, the reactor was cooled to 60° C., and 4,939 parts was extracted from the resultant MEO-10 and then reheated to 155° C. under a nitrogen atmosphere, and then, with this 155° C. kept, 4,950 parts of ethylene oxide was introduced into the reactor under the safe pressure in 3 hours.

Thereafter, that temperature was kept for 1 hour to complete the alkylene oxide addition reaction, thus obtaining an alkylene oxide addition product as formed by addition of 25 mols on average of ethylene oxide to methanol (hereinafter this product is referred to as MEO-25).

It was confirmed by liquid chromatography that polyethylene glycol was by-produced in an amount of 0.45 weight %.

Incidentally, in this example, the change in volume between before and after the reaction in the initial step to obtain the alkylene oxide low-mol-addition product was 10 times.

EXAMPLE 2

Esterification Reaction (1)

A reactor, as equipped with a thermometer, a stirrer, a water separator, and a reflux condenser, was charged with 16,500 parts of MEO-25 (as obtained in Example 1), 4,740 parts of methacrylic acid, 235 parts of p-toluenesulfonic acid monohydrate, 5 parts of phenothiazine, and 1,060 parts of cyclohexane to carry out an esterification reaction at a reaction temperature of 115° C.

It was confirmed that the esterification ratio had reached 98% in about 18 hours. Thereafter, the temperature was dropped, and then 135 parts of a 49% aqueous sodium hydroxide solution and 4,890 parts of water were added to neutralize the p-toluenesulfonic acid at not higher than 90° C., and then the temperature was raised to distil off the cyclohexane by azeotropic distillation with water, and then adjustment water was added to obtain an 80% aqueous esterification product solution.

EXAMPLE 3

Polymerization Reaction (1)

A reactor, as equipped with a thermometer, a stirrer, dropping funnels, a nitrogen-introducing tube, and a reflux condenser, was charged with 8,200 parts of ion-exchanged water, and then air in the reactor was displaced with nitrogen under stirring, and then the temperature was raised to 80° C. under a nitrogen atmosphere. Next, there was dropwise added over a period of 4 hours a solution as prepared by dissolving 94 parts of 3-mercaptopropionic acid (as a chain transfer agent) into 13,100 parts of the 80% aqueous esterification product solution (as obtained in Example 2), and at the same time there was dropwise added over a period of 5 hours an aqueous solution as prepared by dissolving 125 parts of ammonium persulfate into 1,000 parts of ion-exchanged water. Thereafter, the temperature was subsequently kept at 80° C. for 1 hour to complete the polymerization reaction, and then the temperature was dropped, and then neutralization was carried out with a 30% aqueous sodium hydroxide solution to adjust the pH to 7, thus obtaining an aqueous copolymer (weight-average molecular weight=21,000) solution (1). Incidentally, during the polymerization reaction, the reaction product was sometimes sampled to measure its pH, so that the pH was found to be in the range of 2.0 to 3.1.

EXAMPLE 4

Production (2) of Alkylene Oxide Addition Product

The MEO-10, as extracted in Example 1, was once transferred into a storage tank, and then 3,540 parts of the MEO-10 was charged from this tank into a stainless high-pressure reactor as equipped with a thermometer, a stirrer, and a nitrogen- and an alkylene oxide-introducing tube. Then, air in the reactor was displaced with nitrogen under stirring, and then the contents of the reactor were heated to 120° C. under a nitrogen atmosphere. Next, the pressure was reduced to 50 Torr under a nitrogen gas flow, and then the contents of the reactor were stirred at 120° C. for 60 minutes. The water content of the reaction system was 200 ppm. The internal pressure of the reactor was returned to normal pressure, and then the contents of the reactor were heated to 155° C. under a nitrogen atmosphere, and then, with this 155° C. kept, 4,950 parts of ethylene oxide was introduced into the reactor under the safe pressure in 3 hours.

Thereafter, that temperature was kept for 1 hour to complete the alkylene oxide addition reaction, thus obtaining an alkylene oxide addition product as formed by addition of 25 mols on average of ethylene oxide to methanol (hereinafter this product is referred to as MEO-25).

It was confirmed by liquid chromatography that polyethylene glycol was by-produced in an amount of 0.49 weight %.

EXAMPLE 5

Esterification Reaction (2)

A reactor, as equipped with a thermometer, a stirrer, a water separator, and a reflux condenser, was charged with 16,500 parts of MEO-25 (as obtained in Example 4), 4,740 parts of methacrylic acid, 235 parts of p-toluenesulfonic acid monohydrate, 5 parts of phenothiazine, and 1,060 parts of cyclohexane to carry out an esterification reaction at a reaction temperature of 115° C.

It was confirmed that the esterification ratio had reached 98% in about 18 hours. Thereafter, the temperature was dropped, and then 135 parts of a 49% aqueous sodium hydroxide solution and 4,890 parts of water were added to neutralize the p-toluenesulfonic acid at not higher than 90° C., and then the temperature was raised to distil off the cyclohexane by azeotropic distillation with water, and then adjustment water was added to obtain an 80% aqueous esterification product solution.

It was confirmed by liquid chromatography that polyethylene glycol dimethacrylate was formed in an amount of 0.3 weight % relative to the nonvolatiles.

EXAMPLE 6

Polymerization Reaction (2)

A reactor, as equipped with a thermometer, a stirrer, dropping funnels, a nitrogen-introducing tube, and a reflux condenser, was charged with 8,200 parts of ion-exchanged water, and then air in the reactor was displaced with nitrogen under stirring, and then the temperature was raised to 80° C. under a nitrogen atmosphere. Next, there was dropwise added over a period of 4 hours a solution as prepared by dissolving 94 parts of 3-mercaptopropionic acid (as a chain transfer agent) into 13,100 parts of the 80% aqueous esterification product solution (as obtained in Example 5), and at the same time there was dropwise added over a period of 5 hours an aqueous solution as prepared by dissolving 125 parts of ammonium persulfate into 1,000 parts of ion-exchanged water. Thereafter, the temperature was subsequently kept at 80° C. for 1 hour to complete the polymerization reaction, and then the temperature was dropped, and then neutralization was carried out with a 30% aqueous sodium hydroxide solution to adjust the pH to 7, thus obtaining an aqueous copolymer (weight-average molecular weight=22,000) solution (2). Incidentally, during the polymerization reaction, the reaction product was sometimes sampled to measure its pH, so that the pH was found to be in the range of 2.0 to 3.1.

EXAMPLE 7

Esterification Reaction (3)

An amount of 16,500 parts of MEO-25 (as obtained in Example 4), 4,740 parts of methacrylic acid (K value=69), 235 parts of p-toluenesulfonic acid monohydrate, 5 parts of phenothiazine, and 1,060 parts of cyclohexane were charged into an externally jacketed glass reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 135 parts of a 49% aqueous sodium hydroxide solution and 4,890 parts of water were added to neutralize the p-toluenesulfonic acid at not higher than 90° C., and then 8 parts of hydroquinone was added, and the temperature was raised to distil off the cyclohexane by azeotropic distillation with water. Thereafter, adjustment water was added to obtain an 80% aqueous esterification product solution.

EXAMPLE 8

Polymerization Reaction (3)

A reactor, as equipped with a thermometer, a stirrer, dropping funnels, a nitrogen-introducing tube, and a reflux condenser, was charged with 712.5 parts of ion-exchanged water, and then air in the reactor was displaced with nitrogen under stirring, and then the temperature was raised to 50° C. under a nitrogen atmosphere. Next, there was dropwise added over a period of 4 hours a solution as prepared by dissolving 11.3 parts of 3-mercaptopropionic acid (as a chain transfer agent) into 1,687.5 parts of the 80% aqueous esterification product solution (as obtained in Example 7), and at the same time there were dropwise added over a period of 5 hours an aqueous solution as prepared by dissolving 9.6 parts of hydrogen peroxide into 300 parts of water and an aqueous solution as prepared by dissolving 12.5 parts of L-ascorbic acid into 300 parts of water. After the end of these dropwise additions, the reaction mixture liquid was maintained at 50° C. for 1 hour, and then neutralization was carried out with a 30% aqueous sodium hydroxide solution to adjust the pH to 7, thus obtaining an aqueous copolymer (weight-average molecular weight=28,000) solution (3). Incidentally, during the polymerization reaction, the reaction product was sometimes sampled to measure its pH, so that the pH was found to be in the range of 3.2 to 3.6.

EXAMPLE 9

Polymerization Reaction (4)

An aqueous copolymer (weight-average molecular weight=29,500) solution (4) was obtained in the same way as of Example 8 except that: the 12.5 parts of L-ascorbic acid was replaced with 12.5 parts of erysorbic acid. Incidentally, during the polymerization reaction, the reaction product was sometimes sampled to measure its pH, so that the pH was found to be in the range of 3.2 to 3.6.

COMPARATIVE EXAMPLE 1

Production (Comparison 1) of Alkylene Oxide Addition Product

A stainless high-pressure reactor, as equipped with a thermometer, a stirrer, and a nitrogen- and an alkylene oxide-introducing tube, was charged with 115 parts of methanol (water content=150 ppm) and 4 parts of sodium hydroxide, and then air in the reactor was displaced with nitrogen under stirring, and then the contents of the reactor were heated to 90° C. under a nitrogen atmosphere. Next, with this 90° C. kept under a safe pressure (conditions where in the reactor the partial pressure of nitrogen was constantly higher than that of ethylene oxide), 160 parts of ethylene oxide was introduced into the reactor in 5 hours.

Thereafter, the reaction temperature was raised to 120° C. and, with this 120° C. kept under the safe pressure, 1,440 parts of ethylene oxide was introduced into the reactor in 4 hours. Furthermore, the reaction temperature was raised to 170° C. and, with this 170° C. kept under the safe pressure, 6,300 parts of ethylene oxide was introduced into the reactor in 3 hours. Furthermore, that temperature was kept for 1 hour to complete the alkylene oxide addition reaction, thus obtaining 8,479 parts of an alkylene oxide addition product as formed by addition of 50 mols on average of ethylene oxide to methanol (hereinafter this product is referred to as MEO-50).

It was confirmed by liquid chromatography that polyethylene glycol was by-produced in an amount of 2.0 weight %.

Incidentally, in this comparative example, the change in volume between before and after the reaction in the alkylene oxide addition process was 49 times.

COMPARATIVE EXAMPLE 2

Esterification Reaction (Comparison 1)

A reactor, as equipped with a thermometer, a stirrer, a water separator, and a reflux condenser, was charged with 16,500 parts of MEO-50 (as obtained in Comparative Example 1), 4,740 parts of methacrylic acid, 235 parts of p-toluenesulfonic acid monohydrate, 5 parts of phenothiazine, and 1,060 parts of cyclohexane to carry out an esterification reaction at a reaction temperature of 115° C.

It was confirmed that the esterification ratio had reached 98% in about 18 hours. Thereafter, the temperature was dropped, and then 135 parts of a 49% aqueous sodium hydroxide solution and 4,890 parts of water were added to neutralize the p-toluenesulfonic acid at not higher than 90° C., and then the temperature was raised to distil off the cyclohexane by azeotropic distillation with water, and then adjustment water was added to obtain an 80% aqueous esterification product solution. It was confirmed by liquid chromatography that polyethylene glycol dimethacrylate was formed in an amount of 1.5 weight % relative to the nonvolatiles.

COMPARATIVE EXAMPLE 3

Polymerization Reaction (Comparison 1)

A reactor, as equipped with a thermometer, a stirrer, dropping funnels, a nitrogen-introducing tube, and a reflux condenser, was charged with 8,200 parts of ion-exchanged water, and then air in the reactor was displaced with nitrogen under stirring, and then the temperature was raised to 80° C. under a nitrogen atmosphere. Next, there was dropwise added over a period of 4 hours a solution as prepared by dissolving 94 parts of 3-mercaptopropionic acid (as a chain transfer agent) into 13,100 parts of the 80% aqueous esterification product solution (as obtained in Comparative Example 2), and at the same time there was dropwise added over a period of 5 hours an aqueous solution as prepared by dissolving 125 parts of ammonium persulfate into 1,000 parts of ion-exchanged water. Thereafter, the temperature was subsequently kept at 80° C. for 1 hour to complete the polymerization reaction, and then the temperature was dropped, and then neutralization was carried out with a 30% aqueous sodium hydroxide solution to adjust the pH to 7, thus obtaining a comparative aqueous copolymer (weight-average molecular weight=80,000) solution (1).

COMPARATIVE EXAMPLE 4

Production (Comparison 2) of Alkylene Oxide Addition Product

A stainless high-pressure reactor, as equipped with a thermometer, a stirrer, and a nitrogen- and an alkylene oxide-introducing tube, was charged with 220 parts of methanol (water content=8,000 ppm) and 4 parts of sodium hydroxide, and then air in the reactor was displaced with nitrogen under stirring, and then the contents of the reactor were heated to 90° C. under a nitrogen atmosphere. Next, with this 90° C. kept under a safe pressure (conditions where in the reactor the partial pressure of nitrogen was constantly higher than that of ethylene oxide), 320 parts of ethylene oxide was introduced into the reactor in 5 hours.

Thereafter, the reaction temperature was raised to 120° C. and, with this 120° C. kept under the safe pressure, 2,880 parts of ethylene oxide was introduced into the reactor in 3 hours. Furthermore, the reaction temperature was raised to 160° C. and, with this 160° C. kept under the safe pressure, 4,700 parts of ethylene oxide was introduced into the reactor in 3 hours. Furthermore, that temperature was kept for 1 hour to complete the alkylene oxide addition reaction, thus obtaining 8,479 parts of an alkylene oxide addition product as formed by addition of 25 mols on average of ethylene oxide to methanol (hereinafter this product is referred to as MEO-25).

It was confirmed by liquid chromatography that polyethylene glycol was by-produced in an amount of 6.7 weight %.

Incidentally, in this comparative example, the change in volume between before and after the reaction in the alkylene oxide addition process was 26 times.

COMPARATIVE EXAMPLE 5

Esterification Reaction (Comparison 2)

A reactor, as equipped with a thermometer, a stirrer, a water separator, and a reflux condenser, was charged with 16,500 parts of MEO-25 (as obtained in Comparative Example 4), 4,740 parts of methacrylic acid, 235 parts of p-toluenesulfonic acid monohydrate, 5 parts of phenothiazine, and 1,060 parts of cyclohexane to carry out an esterification reaction at a reaction temperature of 115° C.

It was confirmed that the esterification ratio had reached 98% in about 18 hours. Thereafter, the temperature was dropped, and then 135 parts of a 49% aqueous sodium hydroxide solution and 4,890 parts of water were added to neutralize the p-toluenesulfonic acid at not higher than 90° C., and then the temperature was raised to distil off the cyclohexane by azeotropic distillation with water, and then adjustment water was added to obtain an 80% aqueous esterification product solution.

It was confirmed by liquid chromatography that polyethylene glycol dimethacrylate was formed in an amount of 5.2 weight % relative to the nonvolatiles.

COMPARATIVE EXAMPLE 6

Polymerization Reaction (Comparison 2)

A reactor, as equipped with a thermometer, a stirrer, dropping funnels, a nitrogen-introducing tube, and a reflux condenser, was charged with 8,200 parts of ion-exchanged water, and then air in the reactor was displaced with nitrogen under stirring, and then the temperature was raised to 80° C. under a nitrogen atmosphere. Next, there was dropwise added over a period of 4 hours a solution as prepared by dissolving 94 parts of 3-mercaptopropionic acid (as a chain transfer agent) into 13,100 parts of the 80% aqueous esterification product solution (as obtained in Comparative Example 5), and at the same time there was dropwise added over a period of 5 hours an aqueous solution as prepared by dissolving 125 parts of ammonium persulfate into 1,000 parts of ion-exchanged water. Thereafter, the temperature was subsequently kept at 80° C. for 1 hour to complete the polymerization reaction, and then the temperature was dropped, and then neutralization was carried out with a 30% aqueous sodium hydroxide solution to adjust the pH to 7, thus obtaining a comparative aqueous copolymer (weight-average molecular weight=50,000) solution (2).

EXAMPLES 10 TO 13, AND COMPARATIVE EXAMPLES 7, 8

Mortar Tests

In order to measure the aqueous copolymer solution (1) (as obtained in Example 3), the aqueous copolymer solution (2) (as obtained in Example 6), the aqueous copolymer solution (3) (as obtained in Example 8), the aqueous copolymer solution (4) (as obtained in Example 9), the comparative aqueous copolymer solution (1) (as obtained in Comparative Example 3), and the comparative aqueous copolymer solution (2) (as obtained in Comparative Example 6) by their performance for use as cement admixtures, there was prepared mortar to which each of these aqueous solutions had been added, and there was measured its flow value.

The mortar tests were all carried out under an atmosphere of 25° C. by use of the materials having a temperature as adjusted to 25° C. The composition of the mortar is as follows: 400 weight parts of normal portland cement (produced by Pacific Cement Co., Ltd.), 800 weight parts of Toyoura standard sand, and 240 weight parts of ion-exchanged water containing each aqueous copolymer solution (water/cement ratio (weight ratio)=0.6). The amount of each aqueous copolymer solution as added (weight % in terms of nonvolatile content of each aqueous solution relative to cement) is shown in Table 1.

The mortar was prepared by: dry-mixing only the cement and sand without water at a low speed for 30 seconds using a HOBART type mortar mixer (N-50 model, produced by HOBART Corporation); and then adding thereto the above ion-exchanged water; and then mixing the resultant mixture at a middle speed for 5 minutes. The resultant mortar was fully filled into a hollow cylinder of 55 mm both in inner diameter and in height as placed on a horizontal table. After 7 minutes from the mixing initiation, this cylinder was gently lifted in perpendicular, and then the major and minor axes of the mortar as spread onto the table were measured, and the average value thereof was regarded as the mortar flow value.

TABLE 1

| | Aqueous copolymer solution used as cement admixture | Amount as added* (weight %) | Flow value (mm) | |
|---|---|---|---|---|
| | | | Initial | After 30 minutes |
| Example 10 | Aqueous copolymer solution (1) | 0.12 | 121 | 109 |
| Example 11 | Aqueous copolymer solution (2) | 0.12 | 120 | 108 |
| Example 12 | Aqueous copolymer solution (3) | 0.12 | 118 | 105 |
| Example 13 | Aqueous copolymer solution (4) | 0.12 | 115 | 104 |
| Comparative Example 7 | Comparative aqueous copolymer solution (1) | 0.12 | 110 | 95 |
| Comparative Example 8 | Comparative aqueous copolymer solution (2) | 0.12 | 100 | 70 |

*Weight % in terms of nonvolatile content relative to cement

From Table 1, it can be confirmed that: the mortar to which the aqueous copolymer solution (1), (2), (3) or (4) has been added has excellent flowability and also its change of the flow value with the passage of time is small. On the other hand, it can be confirmed that: the mortar to which the comparative aqueous copolymer solution (1) or (2) has been added has low initial flowability and also its change of the flow value with the passage of time is large, wherein a raw material for the comparative aqueous copolymer solution is an alkylene oxide addition product produced without dividing the alkylene oxide addition reaction into the initial step and the molar-degree-of-polyaddition-adjusting step.

INDUSTRIAL APPLICATION

In the present invention production process for an alkylene oxide addition product, an alkylene oxide addition product having a high molar degree of polyaddition of the alkylene oxide can be produced by use of ordinary facilities without considering the increase of the volume of the product relative to the volume as charged. Furthermore, in this process, it is not necessary to reduce the amount of the raw materials as charged in consideration of the volume of the product, therefore the increase of the amount of water, mingling from an apparatus, relative to such an amount of the raw materials as charged can be prevented, and the increase of the by-products (e.g. poly(alkylene oxide)) can be suppressed. Accordingly, various reactions can favorably be carried out by using the alkylene oxide addition product and, particularly, when a (meth)acrylate ester is produced by carrying out an esterification reaction between the alkylene oxide addition product and (meth)acrylic acid or a transesterification reaction between the alkylene oxide addition product and an alkyl ester of (meth)acrylic acid, or when a (meth)acrylic copolymer is produced by carrying out a polymerization reaction of a monomer component including a (meth)acrylate ester as obtained by carrying out an esterification reaction between the alkylene oxide addition product and (meth)acrylic acid or a transesterification reaction between the alkylene oxide addition product and an alkyl ester of (meth)acrylic acid, the formation of such as by-products can be suppressed, therefore excellent production processes for the above objective products can be provided.

The invention claimed is:

1. A production process for an alkylene oxide addition product, which comprises the step of carrying out an addition reaction of an alkylene oxide to a hydroxyl-group-containing saturated compound in order to obtain the alkylene oxide addition product;
   with the production process further comprising: an initial step of causing the alkylene oxide to add by an addition reaction to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product wherein the hydroxyl-group-containing saturated compound has a water content of not more than 6,000 ppm; and a molar-degree-of-polyaddition-adjusting step of causing the alkylene oxide to further add by an addition reaction to the alkylene oxide low-mol-addition product as obtained in the initial step; wherein a part of the entirety of the alkylene oxide low-mol-addition product as obtained in the initial step is used in the molar-degree-of-polyaddition-adjusting step, and where the amount of the alkylene oxide used in the molar-degree-of-polyaddition-adjusting step is not larger than 20 mols on average per 1 mol of the alkylene oxide low-mol-addition product.

2. A production process for an alkylene oxide addition product according to claim 1, wherein the hydroxyl-group-containing saturated compound is a saturated monohydric alcohol or monohydric phenol having 1 to 30 carbon atoms.

3. A production process for a (meth)acrylate ester, which comprises the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid, thereby obtaining the (meth)acrylate ester;
   wherein the alkylene oxide addition product from the hydroxyl-group-containing saturated compound is a product obtained by a process including: an initial step of causing the alkylene oxide to add by an addition reaction to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product, wherein the hydroxyl-group containing saturated compound has a water content of not more than 6,000 ppm; and a molar-degree-of-polyaddition-adjusting step of causing the alkylene oxide to further add by an addition reaction to the alkylene oxide low-mol-addition product as obtained in the initial step; wherein a part of the entirety of the alkylene oxide low-mol-addition product as obtained in the initial step is used in the molar-degree-of-polyaddition-adjusting step, and where the amount of the alkylene oxide used in the molar-degree of polyaddition-adjusting step is not larger than 20 mols on average per 1 mol of the alkylene oxide low-mol-addition product.

4. A production process for a (meth)acrylate ester according to claim 3, wherein the hydroxyl-group-containing saturated compound is a saturated monohydric alcohol or monohydric phenol having 1 to 30 carbon atoms.

5. A production process for a (meth)acrylic copolymer, which comprises the step of carrying out a polymerization reaction of a monomer component including a (meth)acrylate ester to thereby obtain the (meth)acrylic copolymer;
   wherein:
      the (meth)acrylate ester is a product obtained by a process including the step of carrying out an esterification reaction between (meth)acrylic acid and an alkylene oxide addition product from a hydroxyl-group-containing saturated compound or a transesterification reaction between the alkylene oxide addition product and an alkyl ester of (meth)acrylic acid;
      wherein the alkylene oxide addition product from the hydroxyl-group-containing saturated compound is a product obtained by a process including: an initial step of causing the alkylene oxide to add by an addition reaction to the hydroxyl-group-containing saturated compound in an amount of not larger than 20 mols on average of the alkylene oxide per 1 mol of the hydroxyl-group-containing saturated compound to thereby obtain an alkylene oxide low-mol-addition product, wherein the hydroxyl-group-containing saturated compound has a water content of not more than 6,000 ppm; and a molar-degree-of-polyaddition-adjusting step of causing the alkylene oxide to further add by an addition reaction to the alkylene oxide low-mol-addition product as obtained in the initial step; wherein a part of the entirety of the alkylene oxide low-mol-addition product as obtained in the initial step is used in the molar-degree-of-polyaddition-adjusting step to obtain the alkylene oxide addition product, and where only the resulting alkylene oxide addition product obtained in the molar-degree-of-polyaddition-adjusting step is used in the esterification reaction or transesterification reaction and where the amount of the alkylene oxide used in the molar-degree-of-polyaddition-adjusting step is not larger than 20 mols on average per 1 mol of the alkylene oxide low-mol-addition product.

6. A production process for a (meth)acrylic copolymer according to claim 5, wherein the hydroxyl-group-containing saturated compound is a saturated monohydric alcohol or monohydric phenol having 1 to 30 carbon atoms.

7. An admixture for cement, wherein the admixture comprises a (meth)acrylic copolymer obtained according to the process of claim 5.

8. A production process for an alkylene oxide addition product according to claim 1, wherein the hydroxyl-group-containing saturated compound is a saturated monohydric alcohol having an alkyl group.

9. A production process for an alkylene oxide addition product according to claim 8, wherein the saturated monohydric alcohol is selected from the group consisting of methanol, ethanol, propanol, and butanol.

10. A production process for a (meth)acrylate ester according to claim 3, wherein the hydroxyl-group-containing saturated compound is a saturated monohydric alcohol having an alkyl group.

11. A production process for a (meth)acrylate ester according to claim 10, wherein the saturated monohydric alcohol is selected from the group consisting of methanol, ethanol, propanol, and butanol.

12. A production process for a (meth)acrylic copolymer according to claim 5, wherein the hydroxyl-group-containing saturated compound is a saturated monohydric alcohol having an alkyl group.

13. A production process for a (meth)acrylic copolymer according to claim 12, wherein the saturated monohydric alcohol is selected from the group consisting of methanol, ethanol, propanol, and butanol.

* * * * *

UNITED STATES PATENT AND TRADEMARK OFFICE
CERTIFICATE OF CORRECTION

PATENT NO.        : 7,402,644 B2
APPLICATION NO.   : 10/500554
DATED             : July 22, 2008
INVENTOR(S)       : Toru Inaoka et al.

Page 1 of 1

It is certified that error appears in the above-identified patent and that said Letters Patent is hereby corrected as shown below:

On the title page item (73), should read: Nippon Shokubai Co., Ltd., Osaka (JP)

Signed and Sealed this

Twenty-third Day of September, 2008

JON W. DUDAS
*Director of the United States Patent and Trademark Office*